(12) United States Patent
Narayanan et al.

(10) Patent No.: US 11,601,364 B2
(45) Date of Patent: *Mar. 7, 2023

(54) EFFICIENT ALGORITHM TO ELIMINATE REDUNDANT SPECIFIC PREFIXES IN FORWARDING INFORMATION BASE USING TRIE

(71) Applicant: Arista Networks, Inc., Santa Clara, CA (US)

(72) Inventors: Kumaran Narayanan, San Ramon, CA (US); Sudip Regmi, Fremont, CA (US); Prashant Srinivas, San Jose, CA (US); Venkitraman Kasiviswanathan, San Ramon, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 17/115,592

(22) Filed: Dec. 8, 2020

(65) Prior Publication Data

US 2021/0144089 A1 May 13, 2021

Related U.S. Application Data

(63) Continuation of application No. 15/470,417, filed on Mar. 27, 2017, now Pat. No. 10,892,986.

(51) Int. Cl.
| | |
|---|---|
| *H04L 45/58* | (2022.01) |
| *H04L 45/48* | (2022.01) |
| *H04L 45/745* | (2022.01) |
| *H04L 45/748* | (2022.01) |
| *H04L 45/021* | (2022.01) |

(52) U.S. Cl.
CPC ............ *H04L 45/48* (2013.01); *H04L 45/745* (2013.01); *H04L 45/748* (2013.01); *H04L 45/021* (2013.01)

(58) Field of Classification Search
CPC ....... H01L 47/34; H01L 47/286; H01L 45/32; H01L 45/20; H01L 45/02; H01L 69/22; H01L 45/48; H01L 45/748; H01L 45/745; H04W 4/06
See application file for complete search history.

(56) References Cited

U.S. PATENT DOCUMENTS

| | | | |
|---|---|---|---|
| 10,892,986 B2* | 1/2021 | Narayanan | .............. H04L 45/48 |
| 2007/0153707 A1* | 7/2007 | Thubert | ............ H04L 45/74591 |
| | | | 370/254 |

(Continued)

*Primary Examiner* — Anez C Ebrahim
(74) *Attorney, Agent, or Firm* — Sprinkle IP Law Group

(57) ABSTRACT

A network element and method for programming a network element that includes detecting an update to a first route in a routing information base (RIB) is disclosed. The method includes locating a first route network prefix associated with the first route within a network prefix trie (NPT); determining that, prior to the update, a first parent network prefix and the first route network prefix were reachable using a pair of different next hops connected to the network element; and determining that, after the update, the first parent network prefix and the first route network prefix are reachable using a first common next hop connected to the network element. The method also includes removing an existing forwarding information base (FIB) entry in the FIB associated with the first route network prefix.

20 Claims, 25 Drawing Sheets

(56) References Cited

U.S. PATENT DOCUMENTS

| | | |
|---|---|---|
| 2007/0177622 A1 | 8/2007 | Kim |
| 2015/0271011 A1 | 9/2015 | Neginhal et al. |
| 2016/0262081 A1* | 9/2016 | Guo ..................... H04W 40/12 |
| 2018/0278517 A1 | 9/2018 | Narayanan et al. |
| 2019/0182140 A1* | 6/2019 | Tenny ................... H04W 48/20 |

* cited by examiner

Forwarding Information Base (FIB) 720A

| No. | Network Prefix | FEC Index |
|---|---|---|
| 1 | 10.0.0.0/8 | $ID_1$ |
| 2 | 12.0.0.0/8 | $ID_2$ |
| 3 | 12.0.2.0/16 | $ID_3$ |
| 4 | 12.0.2.1/32 | $ID_4$ |
| 5 | 10.0.1.0/16 | $ID_1$ |

(Prior Art)

Forwarding Information Base (FIB) 720B

| No. | Network Prefix | FEC Index |
|---|---|---|
| 1 | 10.0.0.0/8 | $ID_1$ |
| 2 | 12.0.0.0/8 | $ID_2$ |
| 3 | 12.0.2.0/16 | $ID_3$ |
| 4 | 12.0.2.1/32 | $ID_4$ |

(FIB Compression)

*FIG. 7B*

Forwarding Information Base (FIB) 720A

| No. | Network Prefix | FEC Index |
|---|---|---|
| 1 | 10.0.0.0/8 | ID$_1$ |
| 2 | 12.0.0.0/8 | ID$_2$ |
| 3 | 12.0.2.0/16 | (ID$_3$) |
| 4 | 12.0.2.1/32 | ID$_4$ |
| 5 | 10.0.1.0/16 | ID$_1$ |

(Prior Art)

Forwarding Information Base (FIB) 720B

| No. | Network Prefix | FEC Index |
|---|---|---|
| 1 | 10.0.0.0/8 | ID$_1$ |
| 2 | 12.0.0.0/8 | ID$_2$ |
| 4 | 12.0.2.1/32 | ID$_4$ |

(FIB Compression)

*FIG. 7C*

| Forwarding Information Base (FIB) 720A | | |
|---|---|---|
| No. | Network Prefix | FEC Index |
| 1 | 10.0.0.0/8 | $ID_1$ |
| 2 | 12.0.0.0/8 | $ID_2$ |
| 3 | 12.0.2.0/16 | $ID_3$ |
| 4 | 12.0.2.1/32 | $ID_4$ |
| 5 | 10.0.1.0/16 | $ID_1$ |

(Prior Art)

| Forwarding Information Base (FIB) 720B | | |
|---|---|---|
| No. | Network Prefix | FEC Index |
| 1 | 10.0.0.0/8 | $ID_1$ |
| 2 | 12.0.0.0/8 | $ID_2$ |

(FIB Compression)

FIG. 7D

EFFICIENT ALGORITHM TO ELIMINATE REDUNDANT SPECIFIC PREFIXES IN FORWARDING INFORMATION BASE USING TRIE

CROSS-REFERENCE TO RELATED APPLICATIONS

This application is a continuation application of U.S. patent application Ser. No. 15/470,417, filed on Mar. 27, 2017, now U.S. Pat. No. 10,892,986, and entitled: "EFFICIENT ALGORITHM TO ELIMINATE REDUNDANT SPECIFIC PREFIXES IN FORWARDING INFORMATION BASE USING TRIE". Accordingly, this application claims benefit of U.S. patent application Ser. No. 15/470,417 under 35 U.S.C. § 120. U.S. patent application Ser. No. 15/470,417 is hereby incorporated by reference in their entirety.

BACKGROUND

Modern network elements include switch chips capable of storing thousands of routes (each associated with a network prefix) in a local routing table. With these immense routing tables, there is a possibility that some more-specific routes may be a subset of other less-specific routes, leading to unnecessary redundancy in information. In waiving the programming of the more-specific routes, which may be subsumed by the less-specific routes, memory and/or persistent storage on a network element may be saved.

SUMMARY

In general, in one aspect, the invention relates to a method for programming a network element. The method includes detecting an addition of a first route in a routing information base (RIB) on the network element, adding, in response to detecting the addition, a first route network prefix associated with the first route to a network prefix trie (NPT), identifying, based on the adding, a first parent network prefix for the first route network prefix using the NPT, making a first determination that the first route network prefix and the first parent network prefix are reachable via a first common next hop connected to the network element, and waiving, based on the first determination, a creation of a forwarding information base (FIB) entry associated with the first route network prefix in a FIB on the network element.

In general, in one aspect, the invention relates to a network element. The network element includes a data plane including a forwarding information base (FIB), and a control plane including a routing information base (RIB) and a FIB Compressor operatively connected to the RIB and the FIB, and configured to detect an addition of a first route in RIB, add, in response to detecting the addition, a first route network prefix associated with the first route to a network prefix trie (NPT), identify, based on the adding, a first parent network prefix for the first route network prefix using the NPT, make a first determination that the first route network prefix and the first parent network prefix are reachable via a first common next hop connected to the network element, and waive, based on the first determination, a creation of a FIB entry associated with the first route network prefix in the FIB.

In general, in one aspect, the invention relates to a non-transitory computer readable medium (CRM) including computer readable program code, which when executed by a computer processor, enables the computer processor to detect an addition of a first route in a routing information base (RIB) on a network element, add, in response to detecting the addition, a first route network prefix associated with the first route to a network prefix trie (NPT), identify, based on the adding, a first parent network prefix for the first route network prefix using the NPT, make a first determination that the first route network prefix and the first parent network prefix are reachable using a first common next hop connected to the network element, and waive, based on the first determination, a creation of a forwarding information base (FIB) entry associated with the first route network prefix in a FIB on the network element.

Other aspects of the invention will be apparent from the following description and the appended claims.

BRIEF DESCRIPTION OF DRAWINGS

FIGS. 7A-7D show various aspects of an example in accordance with one or more embodiments of the invention.

DETAILED DESCRIPTION

Figure 1:
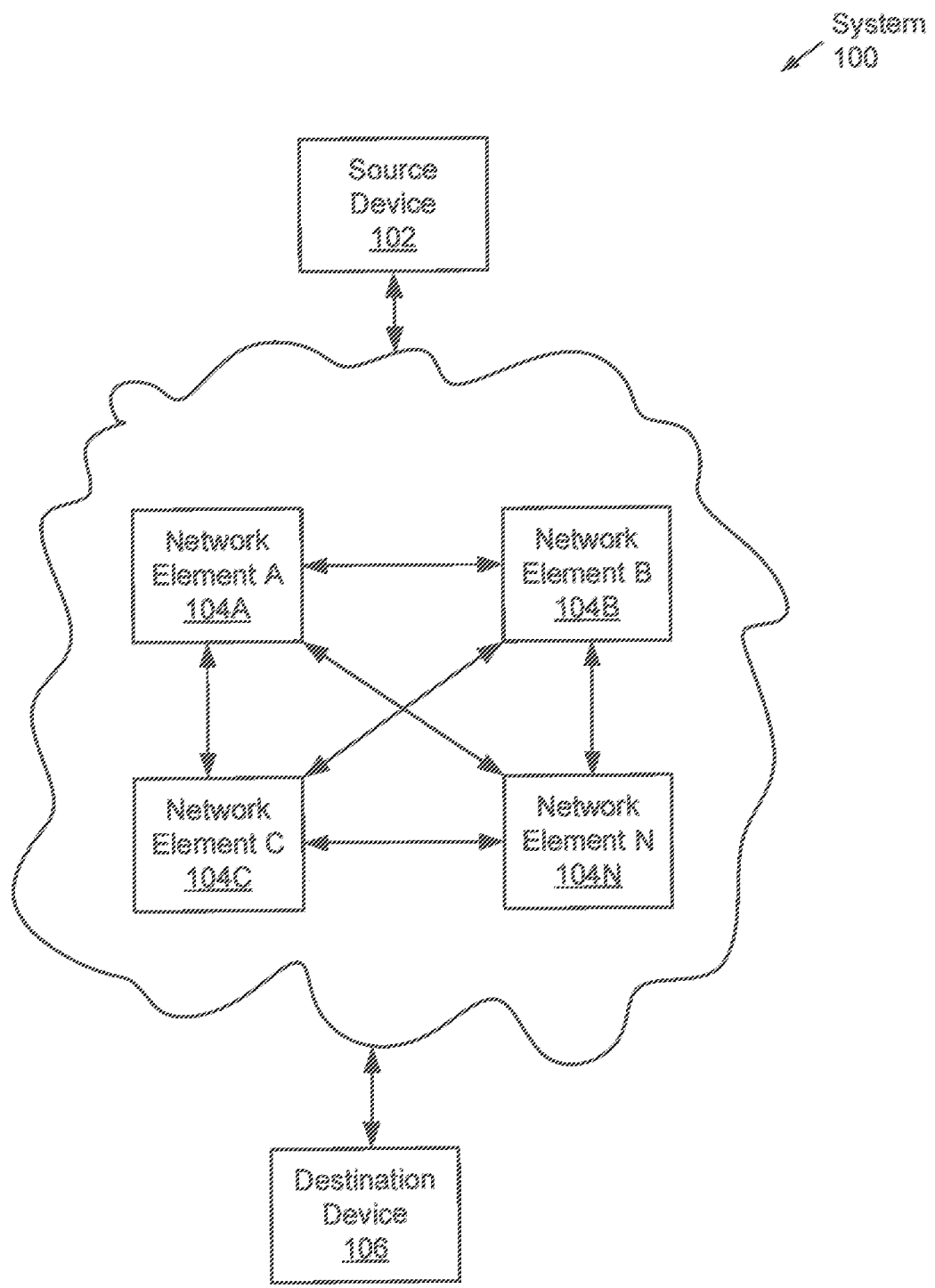
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-8B, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to the compression of a forwarding information base (FIB) on a network element. Specifically, one or more embodiments of the invention entails maintaining a hierarchical trie data structure for cataloging all the network prefixes specified in the routing information base (RIB) on the network element. More specifically, updates to the RIB are reflected onto a network prefix trie (NPT) (e.g., the hierarchical trie data structure). The updates may correspond to an addition or a deletion of, or a change to, a route in the RIB, which prompts the addition or deletion of, or a change pertinent to, a network prefix associated with the route in the NPT. Further, based on the NPT and/or trie nodal information associated with each network prefix in the NPT, a parent and zero or more child network prefixes relating to the route network prefix may be identified. Subsequently, updates to the FIB (including compression) are performed pending comparisons between bridging next hop information (BNHI) (for next hops connected to the network element) corresponding to the route network prefix, the parent network prefix, and the zero or more child network prefixes.

One or more embodiments of the invention provide a method and system to improve the efficiency for programming routes in a FIB. More specifically, an in-memory tree data structure is used to make a small number of comparisons in order to: (i) determine whether to include the route in the FIB and (ii) to determine whether, in response to adding a new route to the FIB, one or more existing entries in the FIB need to be removed. Embodiments of the invention, enable the system to utilize a single comparison between the route network prefix and a parent network prefix in the tree data structure. If this comparison is successful (i.e., the route network prefix should be programmed into the FIB), then the route network prefix is compared to the immediate child network prefixes of the parent network prefix in order to determine whether any entries corresponding to the child network prefixes should be removed by the FIB. In this manner, embodiments of the invention provide the ability to efficiently program the FIB while reducing the maintaining of redundant route network prefixes into the FIB.

FIG. 1 shows a system in accordance with one or more embodiments of the invention. The system (100) includes a source device (102), one or more network elements (104A-104N), and a destination device (106). Each of these components is described below.

In one embodiment of the invention, the aforementioned components may be directly or indirectly connected to each other using any combination of wired and/or wireless connections. Further, the aforementioned components may communicate with each other using any combination of wired and/or wireless communication protocols.

In one embodiment of the invention, the source device (102) may be any computing system (see e.g., FIGS. 8A and 8B) that includes functionality to communicate with the destination device (106). More specifically, the source device (102) may include functionality to generate and transmit network packets addressed to the destination device (106). The source device (102) may include further functionality to receive and process network packets addressed to the source device (102) from the destination device (106). Examples of the source device (102) include, but are not limited to, a desktop computer, a laptop computer, a tablet computer, a server, a smartphone, a virtual machine executing on any of the aforementioned examples, or any combination thereof.

In one embodiment of the invention, a network element (104A-104N) may be a physical device that includes persistent storage, memory (e.g., random access memory (RAM), shared memory), one or more computer processor(s) (e.g., integrated circuits) (including a switch chip or network processor)), and two or more physical network interfaces or ports. The persistent storage in the network element (104A-104N) may include any type of non-transitory computer readable medium that includes instructions, which when executed by the one or more computer processor(s), enable the network element (104A-104N) to perform functions described below in accordance with one or more embodiments of the invention (see e.g., FIGS. 4A-6F). In one embodiment of the invention, the various data structures pertinent to embodiments of the invention (e.g., the routing information base (RIB), the forwarding information base (FIB), the forwarding equivalence class (FEC) Table, and the network prefix trie (NPT)) may be stored/maintained in the persistent storage, the memory, any other storage mechanism, or any combination thereof.

In one embodiment of the invention, a network element (104A-104N) may include functionality to receive network packets at a network interface or port from the source device (102) or another (i.e., a second) network element (104A-104N). A network element (104A-104N) may include further functionality to subsequently transmit the received network packets to yet another (i.e., a third) network element or the destination device (106) through the same or a different network interface or port. Examples of a network element (104A-104N) include, but are not limited to, a switch, a router, and a multilayer switch. A network element (104A-104N) is discussed in further detail below with respect to FIG. 2.

In one embodiment of the invention, the destination device (106) may be any computing system (see e.g., FIGS. 8A and 8B) that includes functionality to communicate with the source device (102). More specifically, the destination device (106) may include functionality to receive and process network packets addressed to the destination device (106) from the source device (102). The destination device (106) may include further functionality to generate and transmit other network packets addressed to the source device (102) in response to receiving network packets from the source device (102). Examples of a destination device (106) include, but are not limited to, a desktop computer, a laptop computer, a tablet computer, a server, a smartphone, a virtual machine executing on any of the aforementioned examples, or a combination thereof.

While FIG. 1 shows a configuration of components, system configurations other than that shown in FIG. 1 may be used without departing from the scope of the invention. For example, multiple destination devices and/or multiple source devices may exist.

Figure 2:
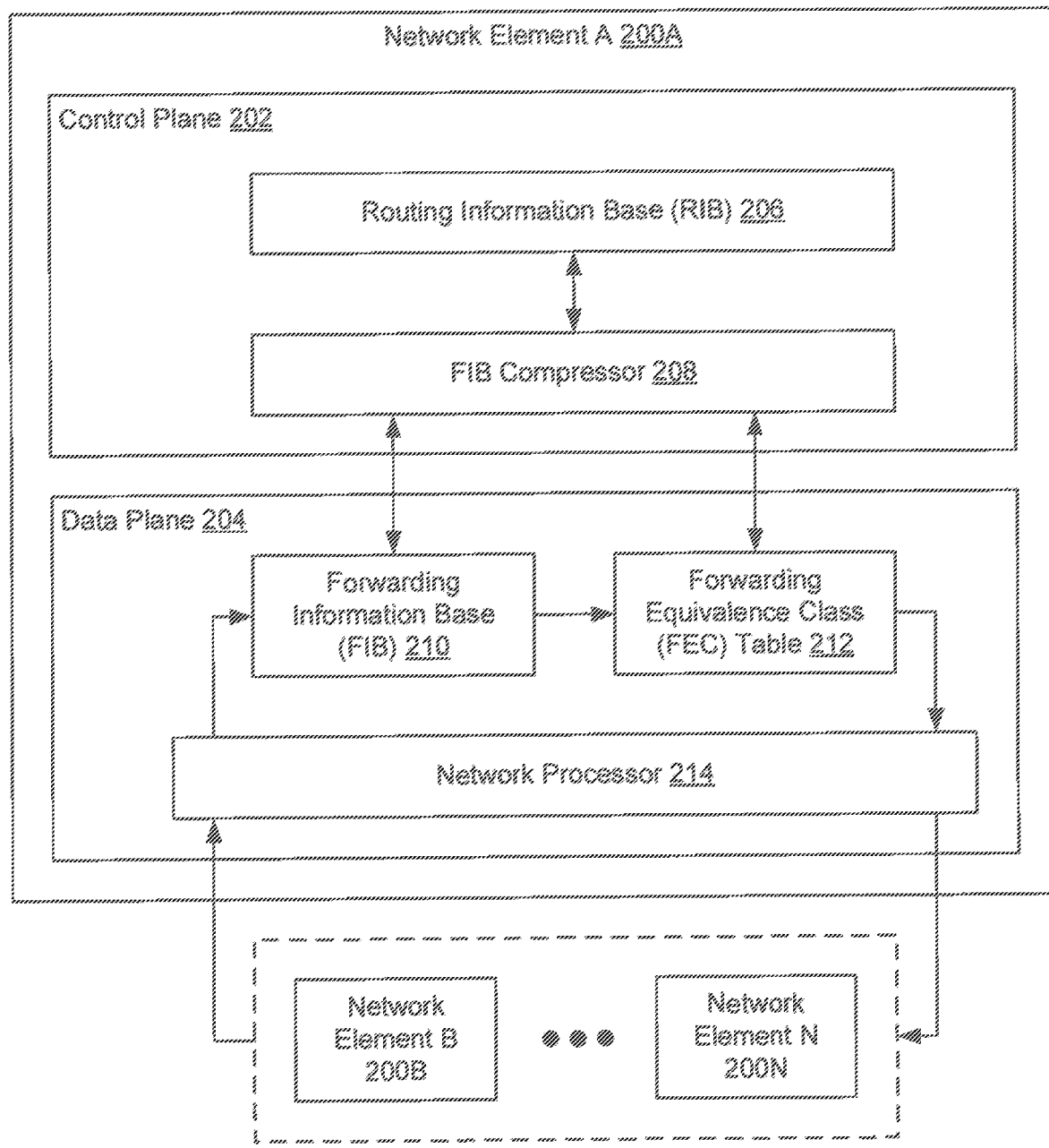
FIG. 2 shows a network element in accordance with one or more embodiments of the invention.

FIG. 2 shows a network element in accordance with one or more embodiments of the invention. The network element (200A) includes a control plane (202) and a data plane (204). Each of these components is described below.

In one embodiment of the invention, the control plane (202) may be a first portion of the architecture employed in the network element (200A). The control plane (202) may be implemented using hardware, software, firmware, and/or any combination thereof. In one embodiment of the invention, the control plane (202) may include functionality to manage the overall operation of the data plane (204) (including programming of the FIB (210) and FEC table (212)). The control plane (202) includes a routing information base (RIB) (206) and a FIB Compressor (208). Each of these components is described below.

In one embodiment of the invention, the RIB (206) may be a data repository for storing and tracking routes to network destinations reachable from the network element (200A). As a data repository, the RIB (206) may take the form of any type of storage unit and/or device such as, for example, a file system, a database, a collection of tables, or any other storage medium. Further, the RIB (206) may include multiple different storage units and/or devices. In one embodiment of the invention, the RIB (206) may include information pertaining to the topology of network immediately around the network element (200A). The RIB (206) may be programmed through the selection of best paths or routes for network packets by one or more routing protocols (e.g., border gateway protocol (BGP), open shortest path first (OSPF), etc.) executing/employed on the network element (200A). Additional details regarding the RIB (206) are described below with respect to FIG. 3A.

In one embodiment of the invention, the FIB Compressor (208) may be a process executing on the one or more computer processor(s) of the network element (200). The FIB Compressor (208) may include functionality to perform functions described below in accordance with one or more embodiments of the invention (see e.g., FIGS. 4A-6F). Specifically, the FIB Compressor (208) may include functionality to: (i) detect updates occurring to the RIB (206) (e.g., additions, deletions, and/or changes to routes in the RIB); (ii) maintain updates to a network prefix trie (NPT) (including trie nodal information) stored on the network element (200) using network prefixes associated with routes in, and based on the detected updates to, the RIB (206); (iii) obtain bridging next hop information (BNHI) corresponding to route network prefixes and their respective parent and/or child network prefixes; (iv) perform comparisons between the obtained BNHI; and (v) program the FIB (210), and potentially the FEC Table (212), based on the performed comparisons.

In one embodiment of the invention, the data plane (204) may be a second portion of the architecture employed in the network element (200A). The data plane (204) may be implemented using hardware, software, firmware, and/or any combination thereof. In one embodiment of the invention, the data plane (206) may include functionality to receive network packets via network interfaces or ports (not shown), process the network packets, and, as appropriate, transmit network packets via the same or different network interfaces or ports towards a destination. The network packets may be received from a source device or another network element (200B-200N), whereas network packets may be transmitted to a destination device or another network element (200B-200N). The data plane (204) includes a FIB (210), a FEC Table (212), and a network processor (214). Each of these components is described below.

In one embodiment of the invention, the FIB (210) may be a data repository for storing and mapping routes to FEC indices. As a data repository, the FIB (210) may take the form of any type of storage unit and/or device such as, for example, a file system, a database, a collection of tables, or any other storage medium. Further, the FIB (210) may include multiple different storage units and/or devices. In one embodiment of the invention, the FIB (210) may be programmed by one or more processes (including the FIB Compressor (208)), which may be executing on the network element (200A). In one embodiment of the invention, the FIB (210) may be programmed based on route entries stored in the RIB (206). Additional details regarding the FIB (210) are described below with respect to FIG. 3B.

In one embodiment of the invention, the FEC Table (212) may be a data repository for storing and mapping FEC indices to next hops. Particularly, the FEC indices are mapped to forwarding (or bridging) information pertaining to next hops along routes to network destinations reachable from the network element (200A). As a data repository, the FEC Table (212) may take the form of any type of storage unit and/or device such as, for example, a file system, a database, a collection of tables, or any other storage medium. Further, the FEC Table (212) may include multiple different storage units and/or devices. In one embodiment of the invention, the FEC Table (212) may be programmed by one or more processes (including the FIB Compressor (208)), which may be executing on the network element (200A). Additional details regarding the FEC Table (212) are described below with respect to FIG. 3C.

In one embodiment of the invention, the network processor (214) may be hardware (e.g., one or more integrated circuit(s)) that determines out of which network interface or port on the network element (200A) to network packets. The network processor (214) may include interfaces or ports that may connect to network interfaces or ports on the network element (200A). Each network interface or port (not shown) may be connected to another network element (200B-200N), a source device, or a destination device (see e.g., FIG. 1). The network processor (214) may be configured to receive network packets via one or more network interfaces and determine whether to (i) drop the network packets, (ii) process the network packets in accordance with one or more embodiments of the invention, and/or (iii) send the network packets, based on the processing, out of one or more same or different network interfaces on the network element (200).

In one embodiment of the invention, how the network processor (214) makes the determination of whether to drop a network packet, and/or send a network packet to another network element (200B-200N) or device depends, in part, on whether the network element (200A) is a layer-2 (L2) switch or a layer-3 (L3) switch (also referred to as a multilayer switch), which may perform at least some functions of a router. If the network element (200A) is operating as a L2 switch, the network processor (214) uses the destination media access control (MAC) address included in the network packet, along with the FIB (214) and the FEC Table (212) to determine out of which network interface or port to send the network packet. If the network element (200A) is operating as a L3 switch, the network processor (214) uses the destination Internet Protocol (IP) address included in the network packet, along with the RIB (206), to determine out of which network interface or port to send the network packet. Further, the network processor (214) includes the ability to write the MAC address of the next hop (e.g., another network element (200B-200N) or device) to send the network packet in place of its own MAC address (which the last network element (200B-200N) or device to send the network packet wrote) in the L2 information encapsulating the network packet. If the network element (200A) is a multilayer switch, the network processor (214) includes functionality to process network packets using both MAC addresses and IP addresses. Examples of a network processor (214) include, but are not limited to, a field programmable gate array (FPGA), an application specific integrated circuit (ASIC), a digital signal processor (DSP), a microcontroller, a discrete processor, etc.

Figure 3A:
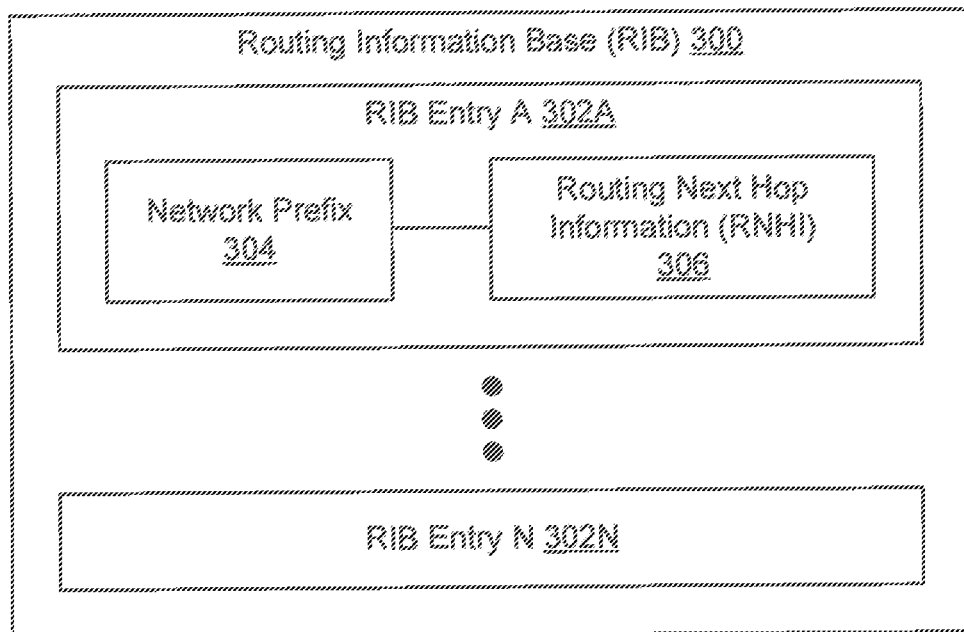
FIG. 3A shows a routing information base in accordance with one or more embodiments of the invention.

FIG. 3A shows a routing information base (RIB) in accordance with one or more embodiments of the invention. The RIB (300) may include one or more RIB entries (302A-302N). Each RIB entry (302A-302N) may correspond to a route to a particular destination. Further, each RIB entry (302A-302N) includes a network prefix (304) and corresponding routing next hop information (RNHI) (306).

In one embodiment of the invention, the network prefix (304) may pertain to a reachable destination that the route, associated with the RIB entry (302A-302N), is used for in order to transmit network packets through and towards the destination. In one embodiment of the invention, the network prefix (304) may be a unique address or identifier assigned to (or associated with) a set of computing systems (e.g., a private network, a subnet, a datacenter, etc.) that may be operatively connected (e.g., directly or indirectly connected) to the network element on which the RIB (300) resides. Subsequently, the network prefix (304) may identify a set of computing systems within a local area network (WAN), a wide area network (WAN) (such as the Internet), or any other type of network.

In one embodiment of the invention, RNHI (306) may include routing information pertaining to a next hop (e.g., another network element or device connected to the network element on which the RIB (300) resides) along a path to a destination. The routing information encompassed in the RNHI (306) may include, but is not limited to, an Internet Protocol (IP) address associated with the next hop, a cost or metric for using the path or route associated with the RIB entry (302A-302N), quality of service (QoS) indicators characterizing a current performance of the path or route, etc.

Figure 3B:
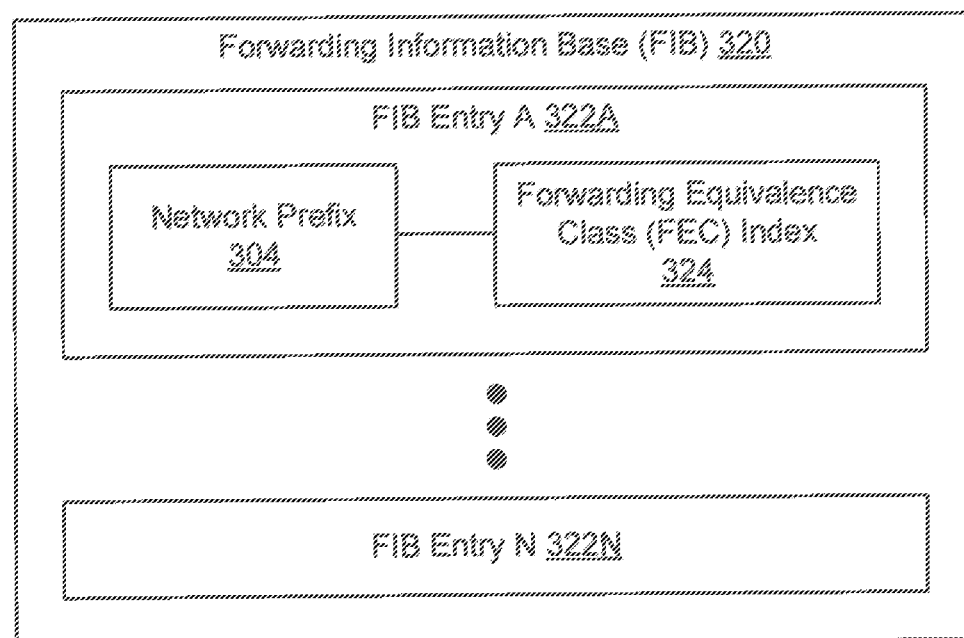
FIG. 3B shows a forwarding information base in accordance with one or more embodiments of the invention.

FIG. 3B shows a forwarding information base (FIB) in accordance with one or more embodiments of the invention. The FIB (320) may include one or more FIB entries (322A-322N), each of which may correspond to a route or RIB entry (302A-302N) in the RIB (300). Further, each FIB entry (322A-322N) includes a network prefix (304) and a corresponding FEC index (324).

In one embodiment of the invention, as described above, the network prefix (304) may pertain to a reachable destination that the route, of which the FIB entry (322A-322N) is associated, is used for in order to transmit network packets through and towards the destination. In one embodiment of the invention, the network prefix (304) may be a unique address or identifier assigned to (or associated with) a set of computing systems (e.g., a private network, a subnet, a datacenter, etc.) that may be operatively connected (e.g., directly or indirectly connected) to the network element on which the FIB (320) resides. Subsequently, the network prefix (304) may identify a set of computing systems within a local area network (WAN), a wide area network (WAN) (such as the Internet), or any other type of network.

Figure 3C:
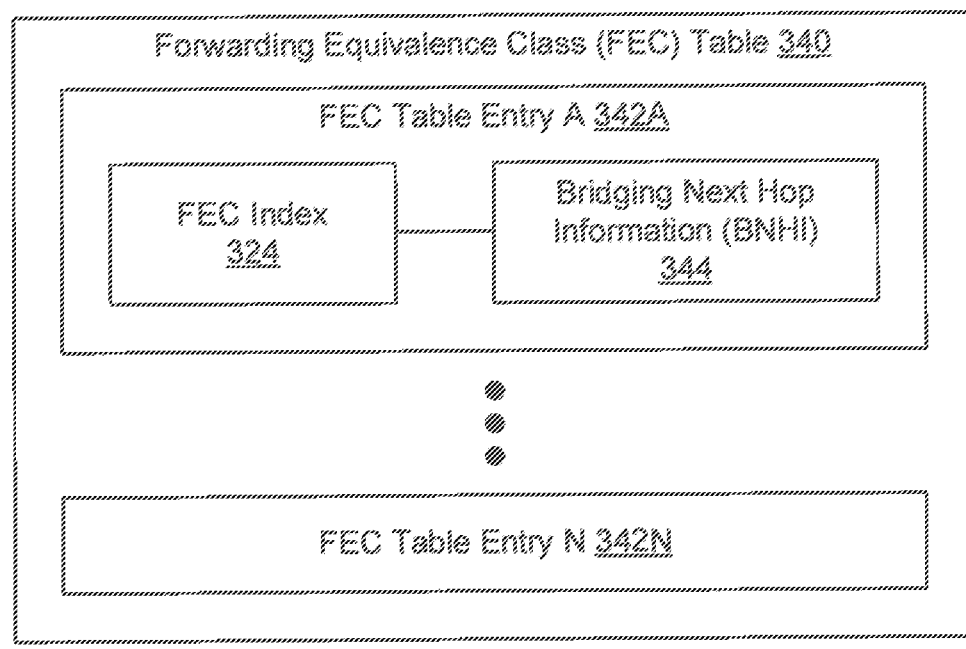
FIG. 3C shows a forwarding equivalence class table in accordance with one or more embodiments of the invention.

In one embodiment of the invention, the FEC index (324) may be an identifier referencing a FEC Table entry (342A-342N) in the FEC Table (340) (see e.g., FIG. 3C). As such, the identifier may be a string of characters (e.g., letters, numbers, symbols, etc.) of any predefined length that is used to uniquely identify the FEC Table entry (342A-342N). Alternatively, the FEC index (324) may be an address in memory associated with or wherein the FEC Table entry (342A-342N) is stored.

FIG. 3C shows a forwarding equivalence class (FEC) table in accordance with one or more embodiments of the invention. The FEC Table (340) may include one or more FEC Table entries (342A-342N), each corresponding to a particular next hop. Further, each FEC Table entry (342A-342N) includes a FEC index (324) and corresponding bridging next hop information (BNHI) (344).

In one embodiment of the invention, as discussed above, the FEC index (324) may be an identifier referencing a FEC Table entry (342A-342N) in the FEC Table (340) (see e.g., FIG. 3C). As such, the identifier may be a string of characters (e.g., letters, numbers, symbols, etc.) of any predefined length that is used to uniquely identify the FEC Table entry (342A-342N). Alternatively, the FEC index (324) may be an address in memory associated with or wherein the FEC Table entry (342A-342N) is stored.

In one embodiment of the invention, BNHI (344) may include bridging or forwarding information pertaining to a next hop (e.g., another network element or device) along a path to a destination. The BNHI (344) may correspond to the RNHI (306) specified in a RIB entry (302A-302N) in the RIB (300) (see e.g., FIG. 3A). The BNHI (344) may be bridging information obtained from performing a next hop resolution on a corresponding RNHI (306). Next hop resolutions are often performed when programming the FIB (320) (see e.g., FIG. 3B) based on routes populated in the RIB (300). In one embodiment of the invention, the bridging or forwarding information encompassed in the BNHI (344) may include, but is not limited to, a media access control (MAC) address associated with the next hop and an identifier associated with a network interface or port on the network element (on which the FEC Table (340) resides) that connects to the next hop. The identifier associated with the network interface or port may be a string of characters (e.g., letters, numbers, symbols, etc.) of any predefined length that is used to uniquely identify the network interface or port.

Figure 3D:
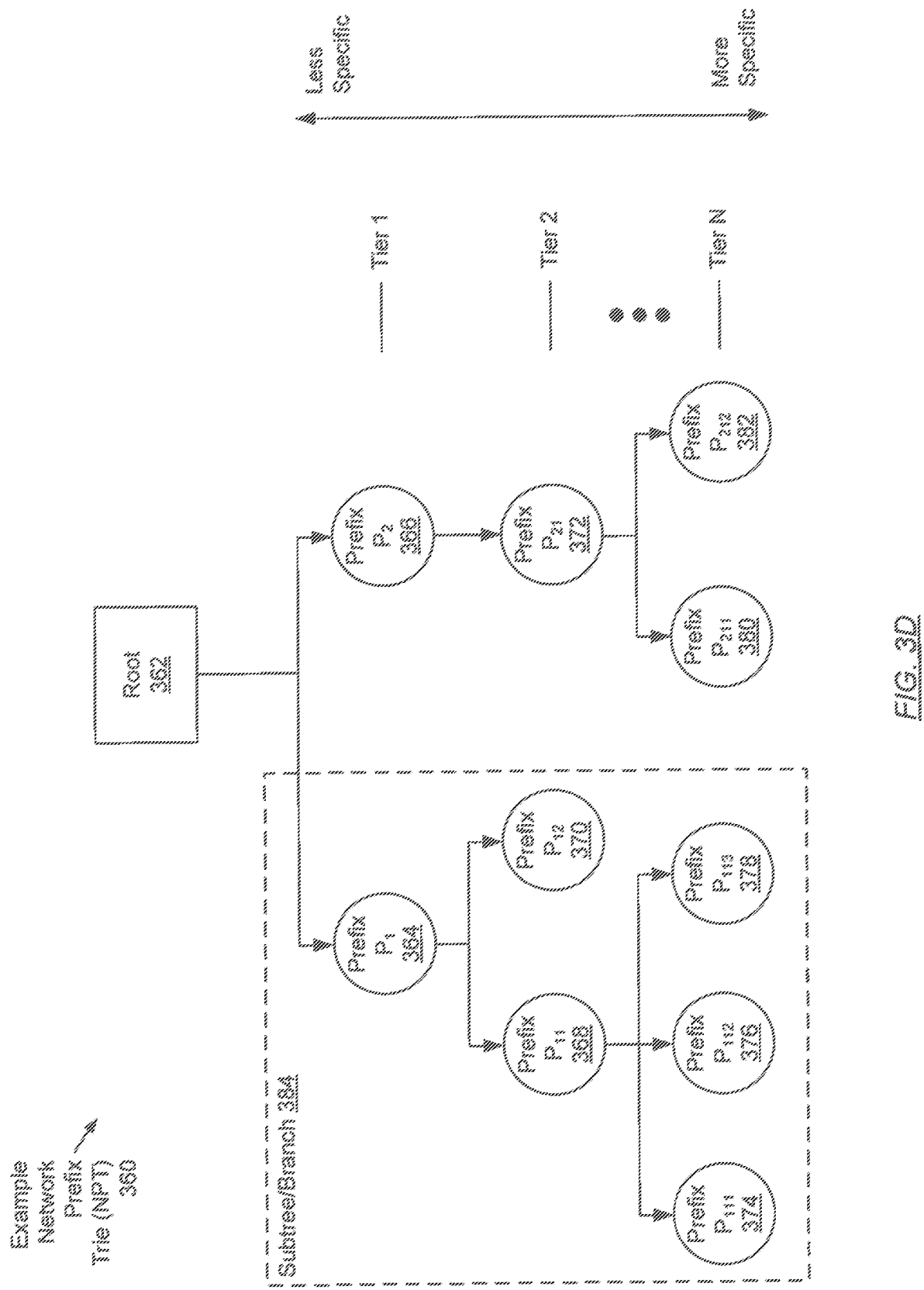
FIG. 3D shows an example network prefix trie in accordance with one or more embodiments of the invention.

FIG. 3D shows an example network prefix trie (NPT) in accordance with one or more embodiments of the invention. In one embodiment of the invention, a NPT (360) may be any data structure ordered in the form of a hierarchical tree. As a hierarchical tree, the NPT (360) may be a collection of nodes (starting at a root node (362)), wherein each is representative of a network prefix (serving as a key within a key-value pair), wherein each node stores resolved BNHI for the network prefix (serving as the corresponding value of the key-value pair). In one embodiment of the invention, each node may further store a set of references to other nodes (discussed below).

In one embodiment of the invention, the nodes (i.e., network prefixes (364, 366, 368, 370, 372, 374, 376, 378, 380, 382)) of the NPT (360) may be arranged based at least on their network prefix size or length. With respect to network prefixes, the network prefix size or length may refer to the number of bits (indicative of Internet Protocol (IP) addresses) contained and/or available in the network block associated with the network prefix. A network block may be a set of IP addresses assigned to a network, such as an Internet Service Provider (ISP), a private network, etc. Moreover, the number of bits remaining for hosting may be deduced from the network prefix size or length. Thus, the lower the network prefix size or length, the more addresses (for hosting) there are available in the associated network block, and further, the less specific the network prefix.

By way of an example, consider an ISP is assigned a network block associated with the network prefix "10.0.0.0/8" (expressed in the classless inter-domain routing (CIDR) notation). Looking at these series of numbers, the network prefix size or length is the number "8", which is specified after the oblique (i.e., the "/") in the network prefix. The series of numbers specified before the oblique (i.e., "10.0.0.0") may be representative of the starting IP address (or root address) for the assigned network block. Further, per this example, the "8" denotes that the associated network block includes 32 minus 8, or 24 bits of hosting address space available using the IP version 4 (IPv4) address specification, or alternatively, 128 minus 8, or 120 bits of hosting address space available using the IP version 6 (IPv6) address specification. Put another way, the "8" denotes that there are $2^{24}$ or $2^{120}$ IP addresses available for hosting given the IPv4 or IPv6 address specification, respectively. By way of another example, if another ISP were assigned another network block associated with the network prefix "11.0.0.0/24", the number of bits available for hosting purposes would be reduced to 32 minus 24, or 8 bits, and 128−24, or 104 bits using the IPv4 and IPv6 address specifications, respectively. That is, the second ISP would be granted $2^8$ or $2^{104}$ IP addresses for hosting, respectively. Thus, again, the lower the network prefix size or length, or the lower the number after the oblique, specified in a network prefix, the more IP addresses available for hosting, and hence, the less specific the network prefix. Conversely, the higher the network prefix size or length, or the higher the number after the oblique, specified in the network prefix, the less IP addresses available for hosting, and hence, the more specific the network prefix.

In one embodiment of the invention, the network prefixes (364, 366, 368, 30, 372, 374, 376, 378, 380, 382) in the NPT (360) may be arranged in ascending specificity the deeper the network prefix is positioned in the NPT (360) (e.g., the furthest the network prefix is positioned from the root node (362)). In reviewing the NPT (360) disclosed in FIG. 3D, for example, the root node (362) may pertain to the default route, or network prefix, of "0.0.0.0/0" assigned within the IP version 4 (IPv4) protocol. The default route may be the Internet in its entirety. From here, the first layer or tier of network prefixes (e.g., Prefix $P_1$ (364) and Prefix $P_2$ (366)), denoted as the immediate children of the root node (362), may pertain to network prefixes following the "X.X.X.X/8" template. The second layer or tier of network prefixes (e.g., Prefix $P_{11}$ (368), Prefix $P_{12}$ (370), and Prefix $P_{21}$ (372)) would follow as children of the first layer or tier of network prefixes, and may pertain to network prefixes following the "X.X.X.X/12" template. Subsequently, the third layer or tier of network prefixes (e.g., Prefix $P_{111}$ (374), Prefix $P_{112}$ (376), Prefix $P_{113}$ (378), Prefix $P_{211}$ (380), and Prefix $P_{212}$ (382)) would succeed the second layer or tier of network prefixes, and may pertain to network prefixes following the "X.X.X.X/16" template. Note that at each successive tier, the network prefixes in that tier specifies a network prefix size or length that is higher than the previous tier. Subsequently, the network prefixes (364, 366, 368, 30, 372, 374, 376, 378, 380, 382) in the NPT (360) may become progressively more specific (i.e., specifying higher and higher network prefix sizes and lengths) the deeper (or the furthest from the root node (360)) the network prefix is positioned. In one embodiment of the invention, the more specific a network prefix, the lower the number of hosts (e.g., computers, servers, etc.) the network prefix can support (e.g., the lower the number of IP addresses available for hosting).

Further, in one embodiment of the invention, a NPT (360) may be segmented into one or more subtrees or branches (384). Each subtree or branch (384) of the NPT (360) may be representative of a network block, and hence, a set of network prefixes, wherein network prefixes positioned in a lower tier may be subsumed by network prefixes positioned in a higher tier. In one embodiment of the invention, a lower-tier network prefix that can be subsumed by a higher-tier network prefix may be considered a child of the higher-tier network prefix. Alternatively, the higher-tier network prefix, which may subsume the lower-tier network prefix, may be considered the parent of the lower-tier network prefix. For example, referring to the example NPT (360) presented in FIG. 3D, Prefix $P_{11}$ (368) may pertain to network prefix "10.0.1.0/24", which may include Prefix $P_{111}$ (374) pertaining to network prefix "10.0.1.1/32". That is, Prefix $P_{111}$ (374) may include a first set of available IP addresses that are a subset of a second set of IP addresses available through Prefix $P_{11}$ (368). In this example, Prefix $P_{11}$ (368) would be considered the parent of Prefix $P_{111}$ (347), whereas, conversely, Prefix $P_{111}$ (374) would be considered the child of Prefix $P_{11}$ (368). In one embodiment of the invention, the root node (e.g., Prefix $P_1$ (364) or Prefix $P_2$ (366)) of a subtree or branch (384) may be an immediate child of the root node (362) of the NPT (360).

Figure 3E:
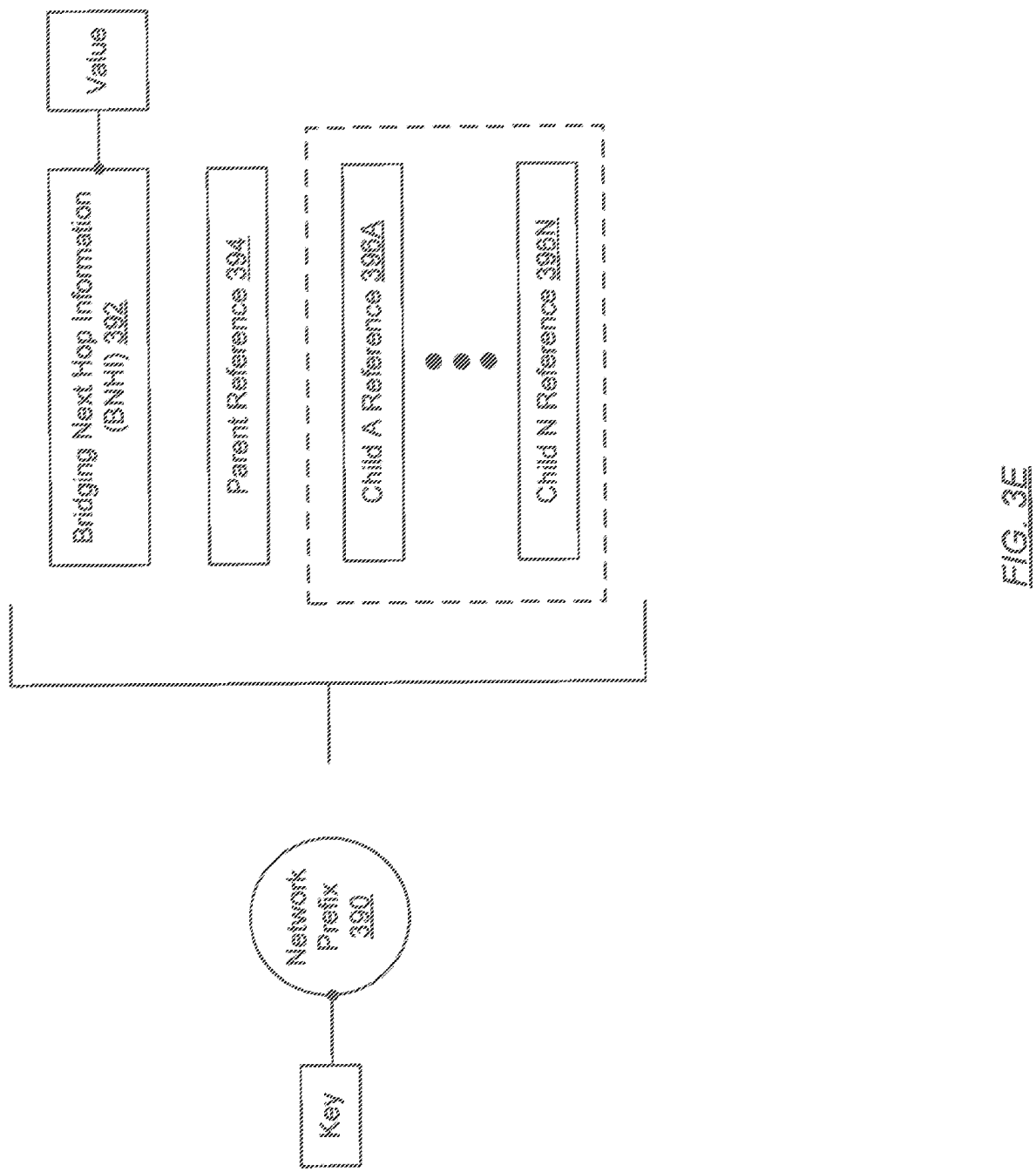
FIG. 3E shows trie nodal information in accordance with one or more embodiments of the invention.

FIG. 3E shows trie nodal information in accordance with one or more embodiments of the invention. Specifically, as mentioned above, each node (including the root node) (390) may be representative of a network prefix (serving as a key to a key-value pair). In one embodiment of the invention, stored in (or associated with) each node (390) may be bridging next hop information (BNHI) (392) (see e.g., FIG. 3C) (serving as a corresponding value to the key-value pair). In one embodiment of the invention, each node (390) may further store (or be associated with) a set of references, which include a parent reference (394) and zero or more child references (396A-396N).

In one embodiment of the invention, a parent reference (394) may be a unique identifier/pointer referencing an address in memory associated with a parent node (or parent network prefix) of the current/instant node or network prefix (390). As such, in one embodiment of the invention, a parent reference (394) may be a string of characters (e.g., letters, numbers, symbols, or any combination thereof) of any predefined length that is used to uniquely identify the parent node (or network prefix) of the current/instant node or network prefix (390) in the NPT. In one embodiment of the invention, the root node of the NPT may store (or be associated with) a parent reference (394) referencing a NULL memory space, indicating that the root node of the NPT has no parent.

Similarly, in one embodiment of the invention, a child reference (396A-396N) may be a unique identifier/pointer referencing an address in memory associated with a child node (or child network prefix) of the current/instant node or network prefix (390). As such, in one embodiment of the invention, a child reference (396A-396N) may be a string of characters (e.g., letters, numbers, symbols, or any combination thereof) of any predefined length that is used to uniquely identify a child node (or network prefix) of the current/instant node or network prefix (390) in the NPT. In one embodiment of the invention, the current/instant node or network prefix (390) may have zero, one, or more children. In one embodiment of the invention, the current/instant node or network prefix (390) may store (or be associated with) a child reference (396A-396N) referencing a NULL memory space, indicating that the current/instant node or network prefix (390) has zero children.

FIGS. 4A-6F show flowcharts in accordance with one or more embodiments of the invention. While the various steps in the flowcharts are presented and described sequentially, one of ordinary skill will appreciate that some or all of the steps may be executed in different orders, may be combined or omitted, and some or all steps may be executed in parallel. In one embodiment of the invention, the steps shown in FIGS. 4A-6F may be performed in parallel with any other steps shown in FIGS. 4A-6F without departing from the scope of the invention.

Figure 4A:
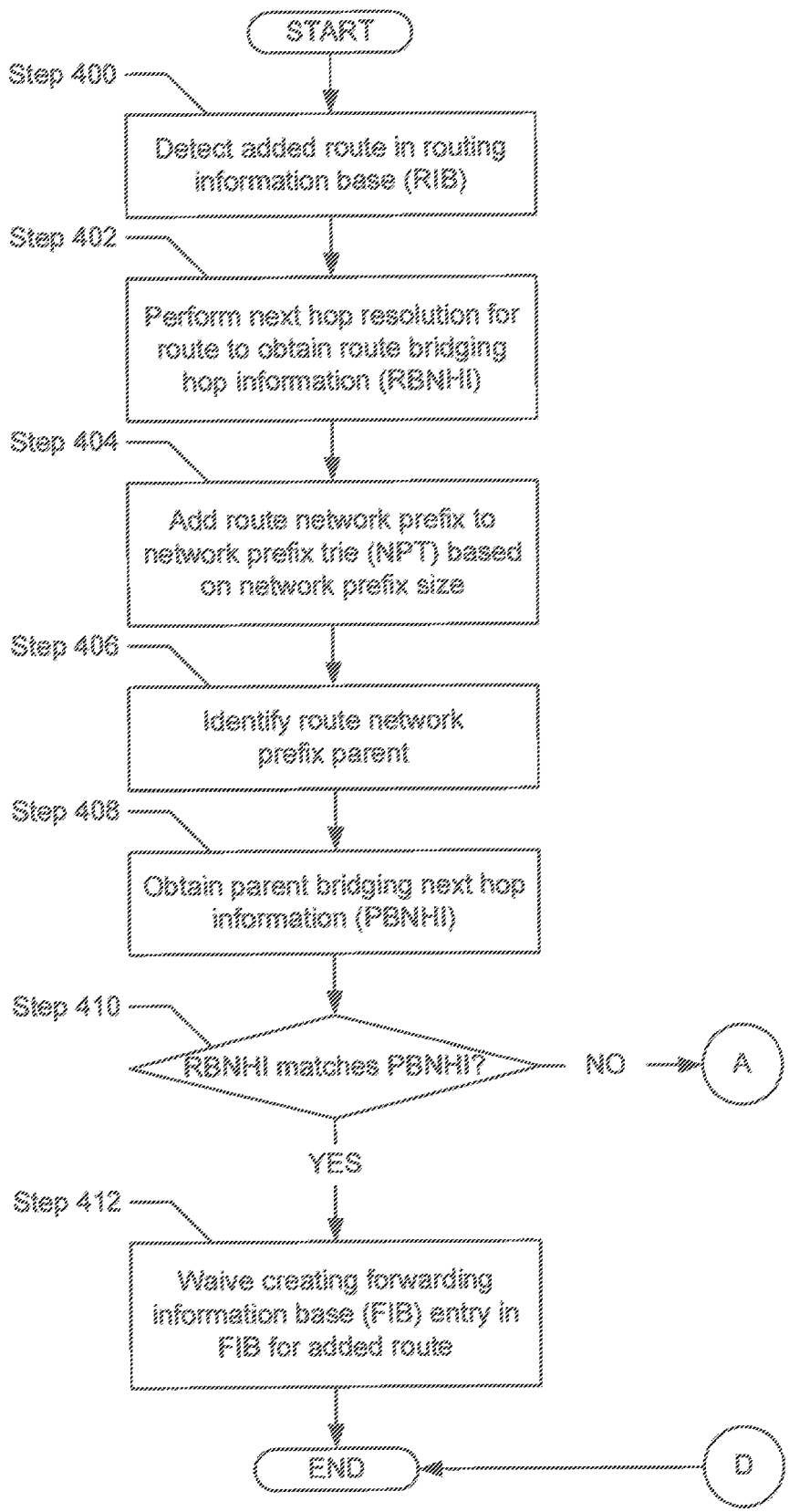
FIGS. 4A-4D show flowcharts describing a method for adding a network prefix to a network prefix trie in accordance with one or more embodiments of the invention.

FIGS. 4A-4D show flowcharts describing a method for adding a network prefix to a network prefix trie in accordance with one or more embodiments of the invention. Turning to FIG. 4A, in Step 400, a route added to the routing information base (RIB) on the network element is detected. In one embodiment of the invention, the detection may take the form of a pushing mechanism (e.g., generation and transmission of a notification by the RIB to the FIB Compressor in response to the adding of a new route in the RIB). In another embodiment of the invention, the detection may take the form of a pulling mechanism (e.g., polling of the RIB by the FIB Compressor to identify a specific event—the adding of a new route in the RIB).

In Step 402, a next hop resolution is performed for the added route detected in Step 400. In one embodiment of the invention, the performing of a next hop resolution results in the obtaining of route bridging next hop information (RBNHI) (see e.g., FIG. 3C). More specifically, the obtaining of the RBNHI may result from resolving the route next hop information (RNHI) (see e.g., FIG. 3A) included in the RIB entry corresponding to the detected route in the RIB. In one embodiment of the invention, RBNHI may include bridging or forwarding information pertaining to a next hop (e.g., another network element or device) along a path to a destination. The bridging or forwarding information encompassed in the RBNHI may include, but is not limited to, a media access control (MAC) address associated with the next hop and an identifier associated with a network interface or port on the network element (on which the FEC Table resides) that connects to the next hop. The identifier associated with the network interface or port may be a string of characters (e.g., letters, numbers, symbols, or any combination thereof) of any predefined length that is used to uniquely identify the network interface or port.

In Step 404, the route network prefix for the route detected in Step 400 (obtained from the RIB entry associated with the route (see e.g., FIG. 3A)) is added to the network prefix trie (NPT) stored on the network element. In one embodiment of the invention, the route network prefix may be added to the NPT based on the network prefix size or length specified in the network prefix (discussed above). In one embodiment of the invention, the route network prefix may be placed in a tier above (and therefore subsumes) any existing network prefixes that include at least a portion of the IP addresses available in the route network prefix. Additionally, or alternatively, the route network prefix may be placed in a tier below (and therefore is subsumed by) an existing network prefix in the NPT, wherein the route network prefix includes at least a portion of the IP addresses available in the existing network prefix.

In one embodiment of the invention, the addition of the route network prefix to the NPT may further entail initialization of the trie nodal information (see e.g., FIG. 3E) stored (or associated) with the route network prefix. As discussed above, trie nodal information may include three elements: (i) BNHI; (ii) a parent reference; and (iii) a set of child references. Subsequently, in one embodiment of the invention, the BNHI of the trie nodal information for the route network prefix may be initialized as the RBNHI obtained in Step 402. Further, the parent reference of the trie nodal information for the route network prefix may be initialized as the identifier/pointer associated with the existing network prefix in the NPT that subsumes the route network prefix. Moreover, the set of child references of the trie nodal information for the route network prefix may be initialized as the identifier(s)/pointer(s) associated with the, if any, existing network prefix(es) in the NPT that is subsumed by the route network prefix.

In one embodiment of the invention, the adding of the route network prefix to the NPT may further entail updating the trie nodal information stored (or associated) with the parent network prefix (e.g., the existing network prefix in the NPT that subsumes the route network prefix) and each of the set of child network prefixes (e.g., the existing network prefix(es) in the NPT that is subsumed by the route network prefix), if any. More specifically, in one embodiment of the invention, with respect to updating the parent trie nodal information, the set of child references of the parent trie nodal information may be updated to include the identifier/pointer associated with the route network prefix (in place of the identifier(s)/pointer(s) associated with the set of child network prefix(es), which used to be the child(ren) of the parent network prefix). With respect to updating each child trie nodal information (of the set of child network prefix(es)), the parent reference of each child trie nodal information may be updated to include the identifier/pointer associated with the route network prefix (in place of identifier/pointer associated with the parent network prefix, which used to be the parent of each of the child network prefixes).

In Step 406, the parent network prefix for/of the route network prefix is identified. In one embodiment of the invention, identification of the parent network prefix may entail accessing the trie nodal information associated with the route network prefix and obtaining the parent reference specified in the route trie nodal information.

In Step 408, the parent bridging next hop information (PBNHI) associated with the parent network prefix is obtained. In one embodiment of the invention, obtaining of the PBNHI may entail accessing the trie nodal information associated with the parent network prefix identified in Step 406 (using the parent reference specified in the route trie nodal information) and obtaining the corresponding BNHI (e.g., value) specified in the parent trie nodal information.

In Step 410, a determination is made as to whether the RBNHI (obtained in Step 402) matches the PBNHI (obtained in Step 408). If it is determined that the RBNHI does match the PBNHI, the process proceeds to Step 412. In one embodiment of the invention, the RBNHI matching the PBNHI may be indicative that both the parent network prefix and the route network prefix are reachable through a common next hop. Subsequently, the forwarding information base (FIB) on the network element need not be updated in response to the addition of the route network prefix (e.g., the added route) to the NPT.

In one embodiment of the invention, the FIB may be limited or compressed to include FIB entries corresponding to routes associated with a set of the least specific network prefixes in the RIB. Subsequently, there exists an assumption that each least specific network prefix in the NPT is already associated with a designated FIB entry in the FIB. In view of this, (i) because the RBNHI matches the PBNHI, and (ii) because the parent network prefix is the least specific network prefix between the parent network prefix and the route network prefix—the existing FIB entry in the FIB associated with the parent network prefix in effect does reference the necessary BNHI (e.g., PBNHI, which matches the RBNHI) to direct any network packets (via the common next hop) towards destinations subsumed by the parent network prefix as well as the route network prefix. Therefore, the route network prefix does not require its own FIB entry in the FIB.

Figure 4B:
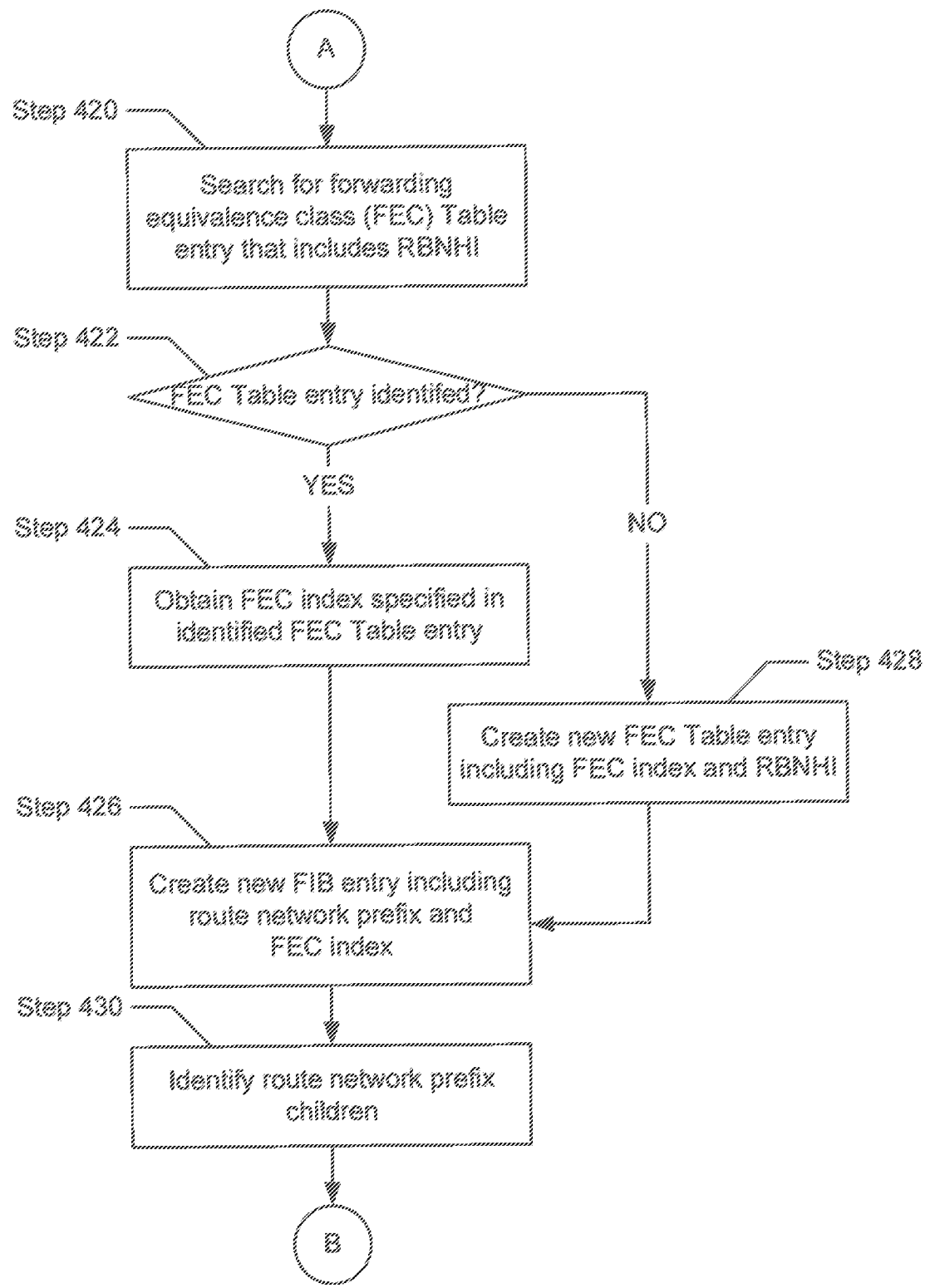

On the other hand, further to Step 410, if it is determined that the RBNHI does not match the PBNHI, the process proceeds to Step 420 (see e.g., FIG. 4B). In one embodiment of the invention, the RBNHI not matching the PBNHI may be indicative that the parent network prefix and the route network prefix are reachable through different next hops. In light of the different next hops, the existing FIB entry in the FIB associated with the parent network prefix (because it is the least specific network prefix between the parent network prefix and the route network prefix) in effect does not reference the necessary BNHI (e.g., RBNHI, which does not match the PBNHI) to direct network packets towards destinations subsumed by the route network prefix. Subsequently, the FIB (and potentially, the forwarding equivalence class (FEC) Table) must be updated to include a designated FIB entry for the route network prefix.

In Step 412, the conventional creation of a new FIB entry in the FIB for the added route (associated with the route network prefix) is waived. In one embodiment of the invention, the waiver is performed as a result of determining (in Step 410) that the RBNHI does match the PBNHI. As noted above, the RBNHI matching the PBNHI does not require its own FIB entry in the FIB. One of ordinary skill in the relevant art would appreciate that, during conventional operation of a network element (e.g., prior to embodiments of the invention), the FIB is programmed/populated by creating FIB entries with a one-to-one correspondence to RIB entries existing in the RIB. Therefore, conventionally, when a route (associated with a new RIB entry) is added to the RIB, a new FIB entry in the FIB is created to correspond with the new RIB entry for the added route in the RIB. Further, because this conventional FIB entry creation mechanism is waived in accordance with embodiments of the invention, one of ordinary skill in the relevant art would thus appreciate that fewer FIB entries are being generated to correspond with each RIB entry in the RIB, which results in a compression of the FIB (relative to the RIB).

Turning to FIG. 4B, in Step 420, a search for an existing FEC Table entry that includes the RBNHI is performed. In one embodiment of the invention, the search is performed as a result of determining (in Step 410) that the RBNHI does not match the PBNHI. As noted above, the RBNHI not matching the PBNHI requires updating of the FIB (and, potentially, the FEC Table) to include a designated FIB entry for the route network prefix. To that end, performing of the search may entail comparing the RBNHI with each BNHI specified in each existing FEC Table entry in the FEC Table. Subsequently, if an existing FEC Table entry specifies BNHI that matches the RBNHI, then that FEC Table entry may be identified as the existing FEC Table entry in the FEC Table that includes the RBNHI.

In Step 422, a determination is made as to whether an existing FEC Table entry that includes the RBNHI (and sought for in Step 420) has been identified. If it is determined that an existing FEC Table entry has been identified, the process proceeds to Step 424. On the other hand, if it is determined that an existing FEC Table entry has not been identified, the process proceeds to Step 428.

In Step 424, after determining (in Step 422) that an existing FEC Table entry (including the RBNHI) has been identified, the FEC index specified in the identified FEC Table entry is obtained. Alternatively, in Step 428, after determining (in Step 422) that no existing FEC Table entry (including the RBNHI) has been identified, a new FEC Table entry is created in the FEC Table. In one embodiment of the invention, the new FEC Table entry is created to include a new FEC index referencing/identifying the new FEC Table entry, and the RBNHI.

In Step 426, a new FIB entry in the FIB is created for the route network prefix. In one embodiment of the invention, the new FIB entry is created subsequent to obtaining the FEC index specified in the existing FEC Table entry sought for and identified in Step 420. In another embodiment of the invention, the new FIB entry is created subsequent to creating a new FEC Table entry in Step 428, which includes a new FEC index and the RBNHI. In one embodiment of the invention, the new FIB entry is created to include the route network prefix and the FEC index (obtained in Step 424 or generated in Step 428).

In Step 430, after updating the FIB and/or the FEC Table to account for the route network prefix, any children, if any, of the route network prefix are identified. In one embodiment of the invention, identification of the children may entail accessing the trie nodal information associated with the route network prefix and obtaining the set of child references, if any, specified in the route trie nodal information.

Figure 4C:
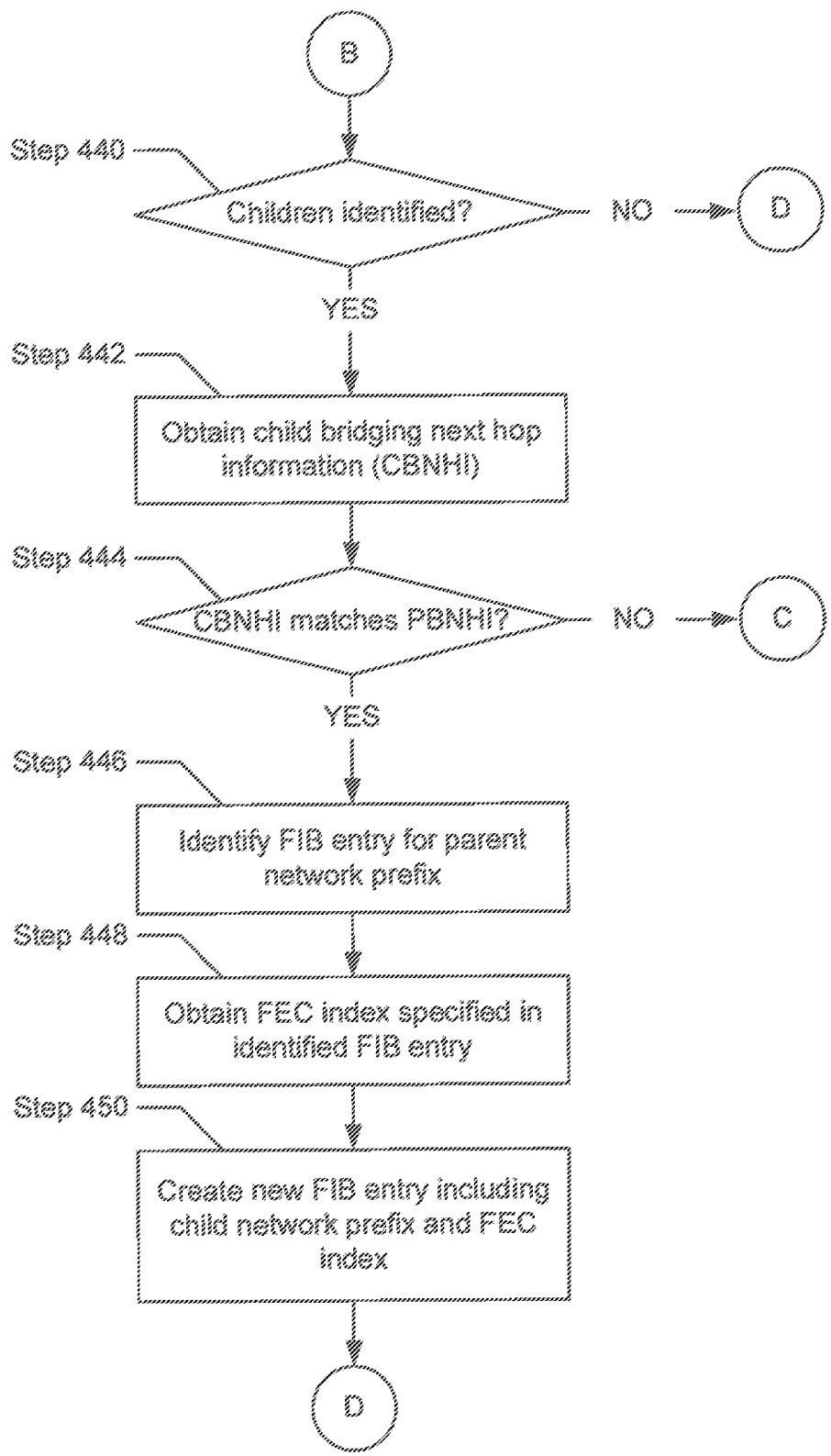

Turning to FIG. 4C, in Step 440, a determination is made as to whether any children under the route network prefix have been identified (pursuant to Step 430). If it is determined that zero children were identified (i.e., the set of child references specified in the route trie nodal information references NULL memory space), then the process ends as no further updates to at least the FIB are necessary. On the other hand, if it is determined that at least one child under the route network prefix has been identified, then the process proceeds to Step 442.

While the following steps (starting at Step 442) reference a particular child network prefix, one of ordinary skill in the art would appreciate that the following steps may be repeated for each child network prefix under the route network prefix that may have been identified in Step 430. Further, with respect to the following steps, consider that prior to the addition of the route network prefix to the NPT (see e.g., Step 404), there exists two possibilities respective to each child network prefix: (i) the child network prefix corresponds to BNHI that did match the PBNHI, and subsequently, did not require a FIB entry of its own because the existing FIB entry for the parent network prefix (which was the parent network prefix for the child network prefix prior to the addition of the route network prefix to the NPT) did reference BNHI appropriate to direct network packets towards destinations subsumed by both the parent network prefix and the child network prefix; or (ii) the child network prefix corresponds to BNHI that did not match the PBNHI, and subsequently, did require a FIB entry of its own because the existing FIB entry for the parent network prefix references BNHI appropriate to direct network packets towards destinations subsumed by the parent network prefix, however, fails to reference BNHI appropriate to direct network packets towards destinations subsumed by the child network prefix. Therefore, in proceeding on to the following steps, consider that a child network prefix may not (further to the first possibility) or may (further to the second possibility) have an existing FIB entry in the FIB for which the child network prefix is associated.

In Step 442, in view of the above, child bridging next hop information (CBNHI) for a/the child network prefix is obtained. In one embodiment of the invention, obtaining of the CBNHI may entail accessing the trie nodal information associated with a/the child network prefix (using a/the child reference specified in the route trie nodal information) and obtaining the corresponding BNHI (e.g., value) specified in a/the child trie nodal information.

In Step 444, a determination is made as to whether the CBNHI (obtained in Step 442) matches the PBNHI (obtained in Step 408). If it is determined that the CBNHI does match the PBNHI, the process proceeds to Step 446. In one embodiment of the invention, the CBNHI matching the PBNHI may be indicative that both the parent network prefix and the child network prefix are reachable through the same next hop. Further, in view of the two possibilities respective to each child network prefix discussed above, because the CBNHI matches the PBNHI, it was not previously necessary to create a FIB entry in the FIB for the child network prefix.

The route network prefix, however, has since become the new "parent" of the child network prefix subsequent to the addition of the route network prefix to the NPT. Consequently, the child network prefix must now rely on the existing FIB entry for the route network prefix (rather than the parent network prefix) to correspond to the appropriate BNHI (e.g., CBNHI) in order to direct network packets towards destinations subsumed by the child network prefix. In one embodiment of the invention, for the existing FIB entry for the route network prefix (created in Step 426) to cover the destinations subsumed by the child network prefix, the RBNHI must match the CBNHI. However, in this case, it is deduced that the RBNHI does not match the CBNHI because the CBNHI matches the PBNHI, and the RBNHI has been determined to not match the PBNHI (see e.g., Step 410). As a result, the existing FIB entry for the route network prefix does not reference the appropriate BNHI in order to direct network packets towards destinations subsumed by the child network prefix. In view of this, the FIB (and potentially, the FEC Table) must be updated to include a designated FIB entry for the child network prefix.

Figure 4D:
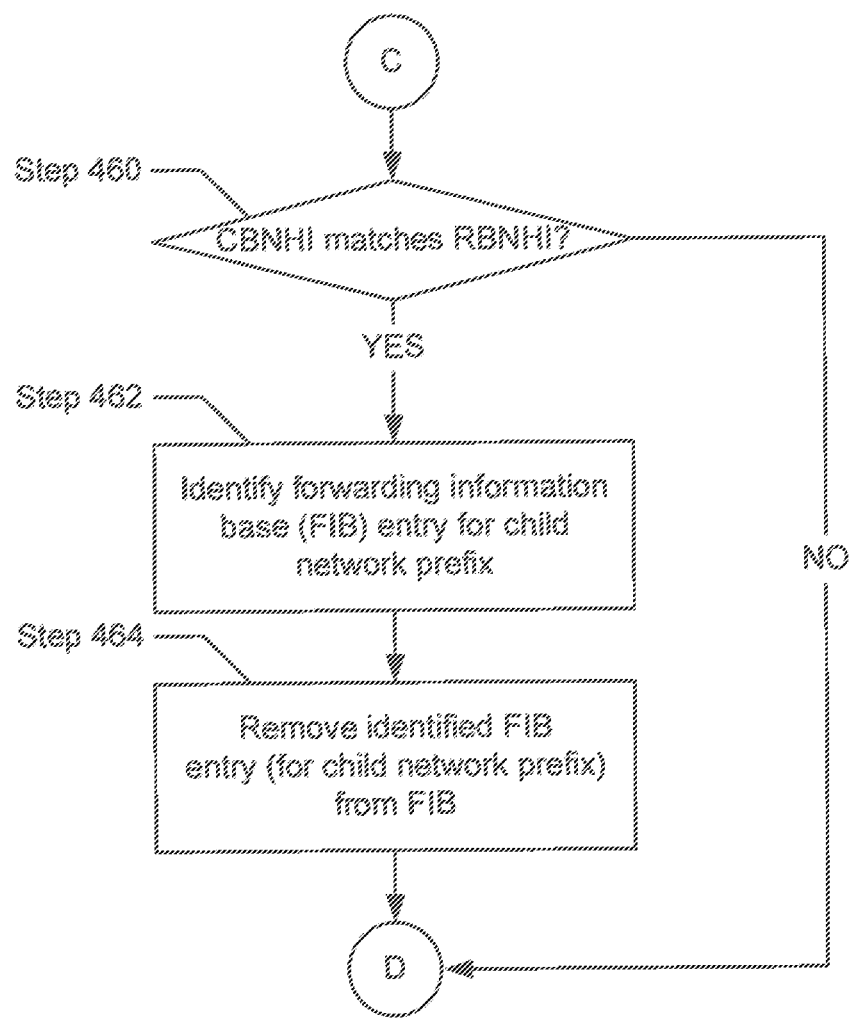

On the other hand, further to Step 444, if it is determined that the CBNHI does not match the PBNHI, the process proceeds to Step 460 (see e.g., FIG. 4D). In one embodiment of the invention, the CBNHI not matching the PBNHI may be indicative that different next hops are used to direct network packets towards destinations subsumed by the child network prefix versus the parent network prefix. Further, in view of the two possibilities respective to each child network prefix discussed above, because the CBNHI does not match the PBNHI, it was previously necessary to create a FIB entry in the FIB for the child network prefix. Therefore, presently, there is an existing FIB entry for which the child network prefix is associated. Additional details respective to the pursuit of this path from Step 444 is discussed below with respect to Step 460 in FIG. 4D.

Proceeding with FIG. 4C, in Step 446, the existing FIB entry in the FIB, for which the parent network prefix is associated, is identified. In one embodiment of the invention, the aforementioned identification may be performed as a result of determining (in Step 444) that the CBNHI does match the PBNHI. As noted above, this determination requires updating of the FIB, and, potentially, the FEC Table because the existing FIB entry for the route network prefix does not reference the appropriate BNHI in order to direct network packets towards destinations subsumed by the child network prefix. To that end, identification of the existing FIB entry for the parent network prefix may entail comparing the parent network prefix with each network prefix specified in each existing FIB entry in the FIB. Subsequently, the existing FIB entry in the FIB that specifies a network prefix matching the parent network prefix may be selected as the existing FIB entry in the FIB associated with the parent network prefix.

In Step 448, the FEC index specified in the existing FIB entry (identified in Step 446) is obtained. In one embodiment of the invention, the FEC index specified in the existing FIB entry for the parent network prefix is obtained because the FEC index references an existing FEC Table entry that includes BNHI (e.g., PBNHI, which matches the CBNHI) appropriate to direct network packets towards destinations subsumed by the child network prefix. Further, in Step 450, a new FIB entry for the child network prefix is created. In one embodiment of the invention, the new FIB entry is created to include the child network prefix and the FEC index obtained in Step 448. With the creation of the FIB entry for the child network prefix, the process respective to the current/instant child network prefix ends.

Turning to FIG. 4D, in Step 460, a determination is made as to whether the CBNHI (obtained in Step 442) matches the RBNHI (obtained in Step 402). In one embodiment of the invention, this determination is performed as a result of determining (in Step 444) that the CBNHI does not match the PBNHI. Thus, if it is determined that the CBNHI does match the RBNHI, then the process proceeds to Step 462. In one embodiment of the invention, the CBNHI matching the RBNHI may be indicative that both the route network prefix and the child network prefix are reachable through the same next hop.

In one embodiment of the invention, as discussed above, because the CBNHI does not match the PBNHI (per Step 444), there presently exists a FIB entry in the FIB for which the child network prefix is associated. Further, because the FIB, in one embodiment of the invention, may be limited or compressed to include FIB entries corresponding to routes associated with a set of the least specific network prefixes in the RIB, the existing FIB entry associated with the route network prefix (created in Step 426) is retained over the existing FIB entry associated with the child network prefix. In other words, because the CBNHI matches the RBNHI, the existing FIB entry for the route network prefix references the BNHI (e.g., RBNHI, which matches the CBNHI) appropriate to direct network packets towards destinations subsumed by both the route network prefix and the child network prefix. Summarily, the existing FIB entry for the child network prefix is no longer necessary, and may be deleted/removed from the FIB.

To that end, in Step 462, after determining (in Step 460) that the CBNHI does match the RBNHI, the existing FIB entry in the FIB, for which the child network prefix is associated, is identified. In one embodiment of the invention, identification of the existing FIB entry associated with the child network prefix may entail comparing the child network prefix with each network prefix specified in each existing FIB entry in the FIB. Subsequently, the existing FIB entry in the FIB that specifies a network prefix matching the child network prefix may be identified as the existing FIB entry in the FIB associated with the child network prefix.

Following this, in Step 464, the existing FIB entry associated with the child network prefix (identified in Step 462) is removed/deleted from the FIB on the network element, and the process respective to the current/instant child network prefix ends.

On the other hand, returning to Step 460, if it is determined that the CBNHI does not match the RBNHI, the process respective to the current/instant child network prefix ends. In one embodiment of the invention, the CBNHI not matching the RBNHI may be indicative that the child network prefix and the route network prefix are reachable through different next hops. Further, in light of the different next hops, the existing FIB entry for the route network prefix does not reference the BNHI (e.g., RBNHI, which does not match the CBNHI) appropriate to direct network packets towards destinations subsumed by the child network prefix. Accordingly, a FIB entry for which the child network prefix is associated must be created. However, because the CBNHI has been determined to not match the PBNHI (see e.g., Step 444), there presently exists a FIB entry in the FIB for which the child network prefix is associated. Therefore, no subsequent updates to the FIB are necessary, and the process respective to the current/instant child network prefix ends.

Figure 5A:
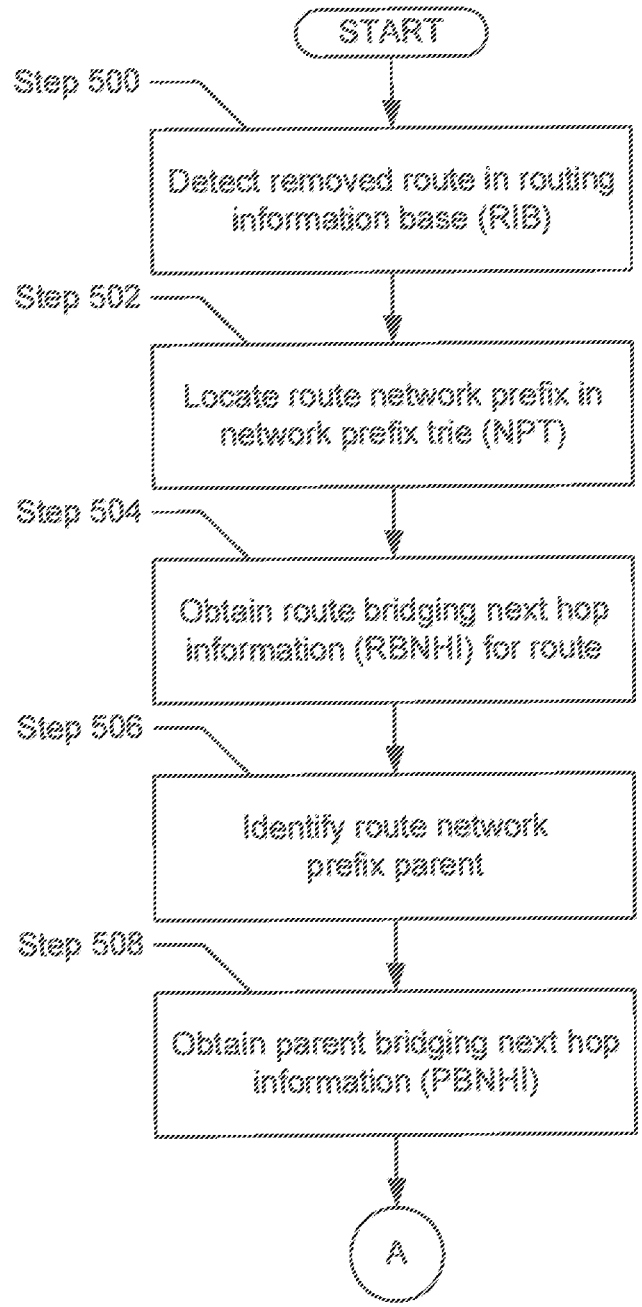
FIGS. 5A-5D show flowcharts describing a method for deleting a network prefix from a network prefix trie in accordance with one or more embodiments of the invention.

FIGS. 5A-5D show flowcharts describing a method for deleting a network prefix from a network prefix trie in accordance with one or more embodiments of the invention. Turning to FIG. 5A, in Step 500, a route removed from the routing information base (RIB) on the network element is detected. In one embodiment of the invention, the detection may take the form of a pushing mechanism (e.g., generation and transmission of a notification by the RIB to the forwarding information base (FIB) Compressor in response to the removal of an existing route in the RIB). In another embodiment of the invention, the detection may take the form of a pulling mechanism (e.g., polling of the RIB by the FIB Compressor to identify a specific event—the removal of any existing route in the RIB).

In Step 502, the route network prefix for the route detected in Step 500 (obtained from the removed RIB entry associated with the route (see e.g., FIG. 3A)) is used to locate the route network prefix in the network prefix trie (NPT). In one embodiment of the invention, locating or searching for the route network prefix in the NPT may involve traversing the NPT using any existing, or later discovered, tree/trie data structure searching algorithms.

In Step 504, the route bridging next hop information (RBNHI) for the route network prefix is obtained. In one embodiment of the invention, obtaining of the RBNHI may entail accessing the trie nodal information stored (or associated) with the route network prefix located in Step 502 and obtaining the corresponding BNHI (e.g., value) specified in the route trie nodal information.

In Step 506, the parent network prefix for/of the route network prefix is identified. In one embodiment of the invention, identification of the parent network prefix may entail accessing the trie nodal information associated with the route network prefix and obtaining the parent reference specified in the route trie nodal information.

In Step 508, the parent bridging next hop information (PBNHI) associated with the parent network prefix is obtained. In one embodiment of the invention, obtaining of the PBNHI may entail accessing the trie nodal information associated with the parent network prefix identified in Step 506 (using the parent reference specified in the route trie nodal information) and obtaining the corresponding BNHI (e.g., value) specified in the parent trie nodal information.

Figure 5B:
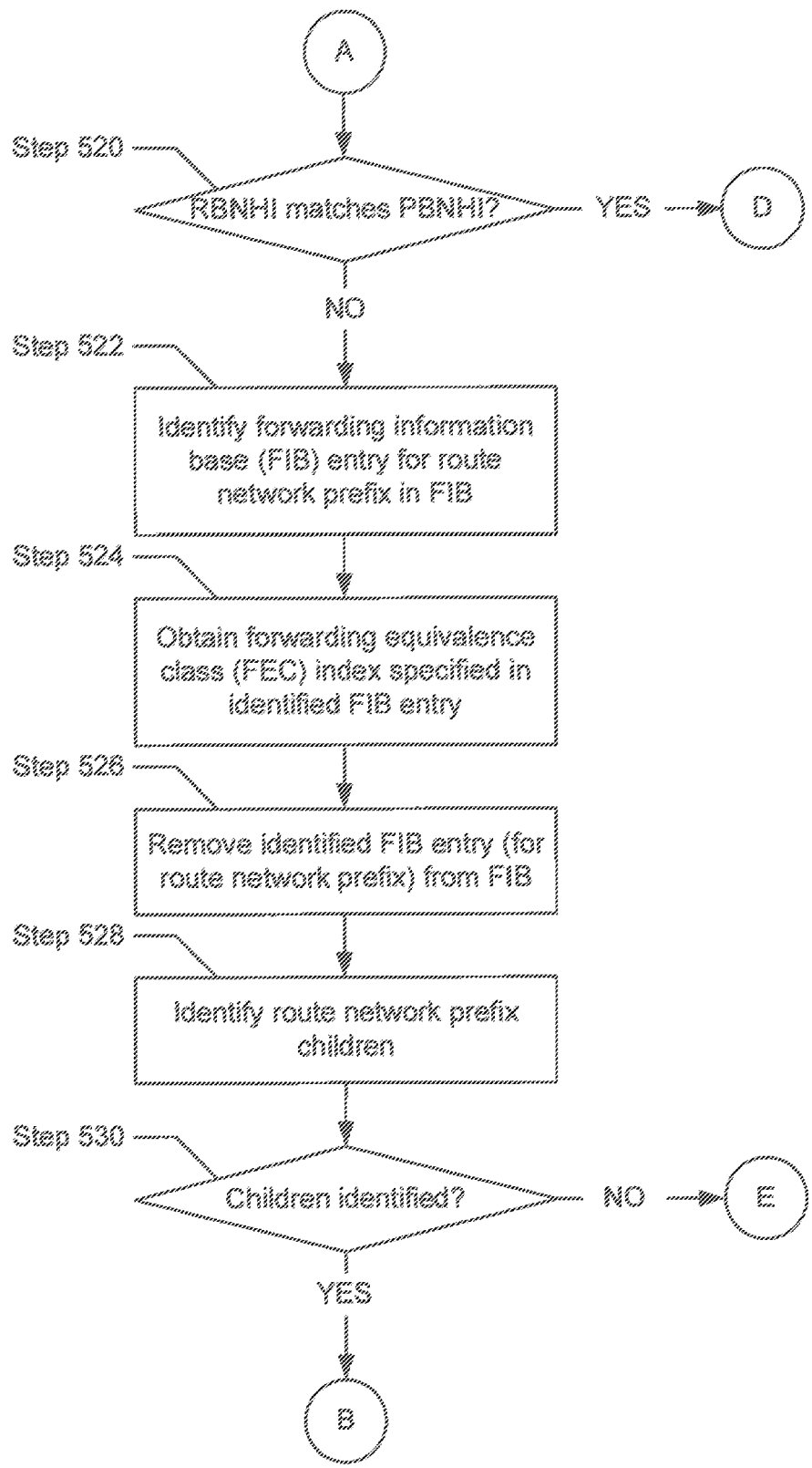

Turning to FIG. 5B, in Step 520, a determination is made as to whether the RBNHI (obtained in Step 504) matches the PBNHI (obtained in Step 508). If it is determined that the RBNHI does match the PBNHI, the process proceeds to Step 546 (see e.g., FIG. 5C). In one embodiment of the invention, the RBNHI matching the PBNHI may be indicative that both the parent network prefix and the route network prefix are reachable through a common next hop. Thus, as it stands in this case, an existing FIB entry in the FIB associated with the parent network prefix references the necessary BNHI (e.g., PBNHI, which matches the RBNHI) to direct network packets (via the common next hop) towards destinations subsumed by the parent network prefix as well as the route network prefix. Further, because the route network prefix does not have an existing FIB entry in the FIB for which it is associated, removal of the route network prefix from the NPT (as a result of the removal of a corresponding route in the RIB) may not require affecting the FIB.

On the other hand, further to Step 520, if it is determined that the RBNHI does not match the PBNHI, the process proceeds to Step 522. In one embodiment of the invention, the RBNHI not matching the PBNHI may be indicative that the route network prefix and the parent network prefix are reachable through different next hops. In light of the different next hops, the existing FIB entry in the FIB associated with the parent network prefix in effect does not reference the necessary BNHI (e.g., RBNHI, which does not match the PBNHI) to direct network packets towards destinations subsumed by the route network prefix. Subsequently, in view of this mismatching, the route network prefix had required its own FIB entry in the FIB for which it is associated. Summarily, because the route network prefix has an existing FIB entry in the FIB for which it is associated, removal of the route network prefix from the NPT (as a result of the removal of a corresponding route in the RIB) may require updating the FIB to delete the aforementioned existing FIB entry.

Proceeding with FIG. 5B, in Step 522, after determining (in Step 520) that the RBNHI does match the PBNHI, the existing FIB entry in the FIB associated with the route network prefix is identified. In one embodiment of the invention, identification of the existing FIB entry associated with the route network prefix may entail comparing the route network prefix with each network prefix specified in each existing FIB entry in the FIB. Subsequently, the existing FIB entry in the FIB that specifies a network prefix matching the route network prefix may be identified as the existing FIB entry in the FIB associated with the route network prefix.

In Step 524, the forwarding equivalence class (FEC) index specified in the existing FIB entry (identified in Step 522) is obtained. In one embodiment of the invention, the specified FEC index may be obtained, and stored elsewhere temporarily, in order to accommodate future steps in the process (see e.g., Step 544 in FIG. 5C). Subsequently, in Step 526, the existing FIB entry (identified in Step 522) is removed/deleted from the FIB on the network element.

In Step 528, after deletion of the existing FIB entry associated with the route network prefix from the FIB, any children, if any, of the route network prefix are identified. In one embodiment of the invention, identification of the children may entail accessing the trie nodal information associated with the route network prefix and obtaining the set of child references, if any, specified in the route trie nodal information.

In Step 530, a determination is made as to whether any children were identified in Step 528. If it is determined that zero children were identified (e.g., the set of child references specified in the route trie nodal information references NULL memory space), then the process ends. On the other hand, if it is determined that at least one child under the route network prefix has been identified, then the process proceeds to Step 540 (see e.g., FIG. 5C).

While the following steps (starting at Step 540) reference a particular child network prefix, one of ordinary skill in the art would appreciate that the following steps may be repeated for each child network prefix under the route network prefix that may have been identified in Step 528.

Figure 5C:
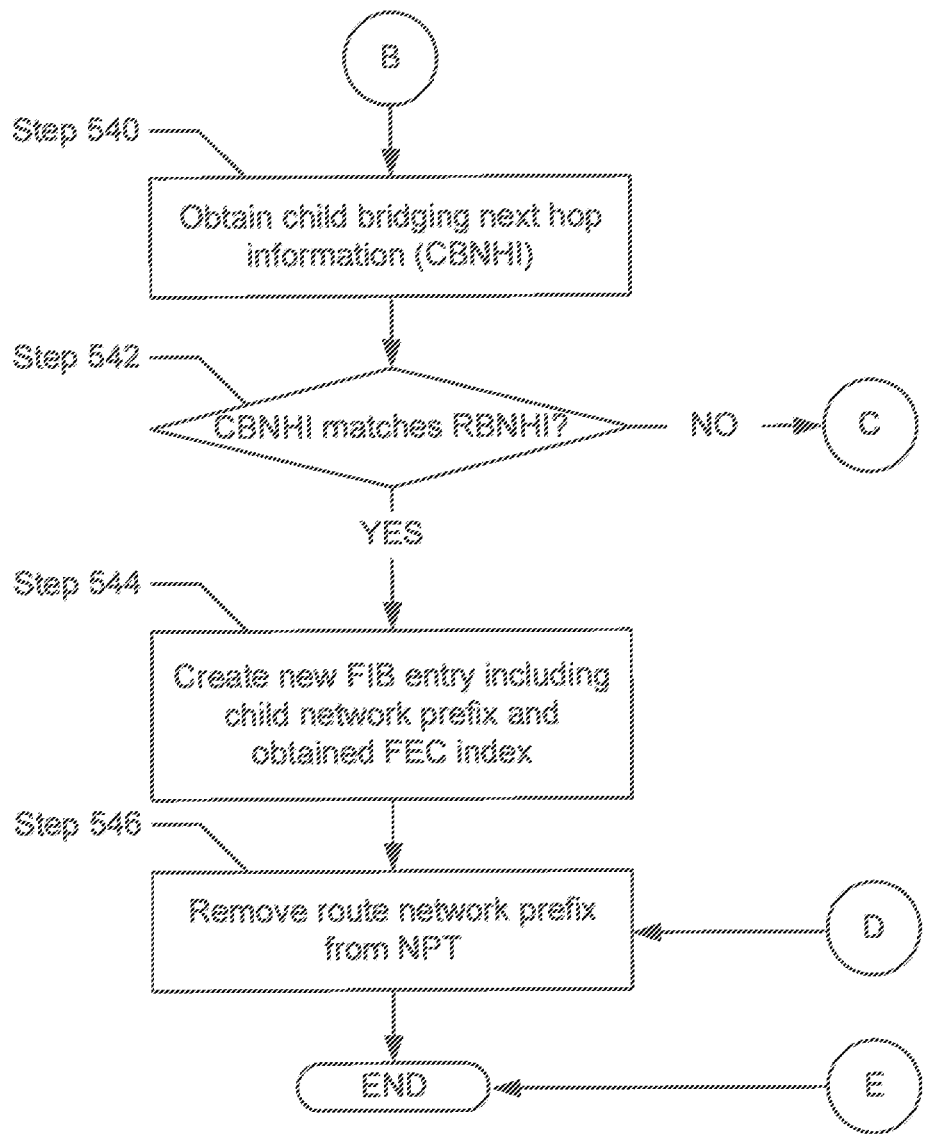

Turning to FIG. 5C, in Step 540, child bridging next hop information (CBNHI) for a/the child network prefix is obtained. In one embodiment of the invention, obtaining the CBNHI may entail accessing the trie nodal information associated with a/the child network prefix (using a/the child reference specified in the route trie nodal information) and obtaining the corresponding BNHI (e.g., value) specified in a/the child trie nodal information.

In Step 542, a determination is made as to whether the CBNHI (obtained in Step 540) matches the RBNHI (obtained in Step 504). If it is determined that the CBNHI does match the RBNHI, the process proceeds to Step 544. In one embodiment of the invention, the CBNHI matching the RBNHI may be indicative that both the child network prefix and the route network prefix are reachable through the same next hop. Thus, prior to the earlier removal of the FIB entry in the FIB associated with the route network prefix (see e.g., Step 526), the destinations subsumed by the child network prefix were covered by the aforementioned FIB entry associated with the route network prefix. However, with the deletion of the FIB entry in the FIB associated with the route network prefix, the capability to direct network packets addressed towards destinations subsumed by the child network prefix no longer exists. Subsequently, the creation of a new FIB entry in the FIB associated with the child network prefix is necessary to resume the aforementioned capability.

Figure 5D:
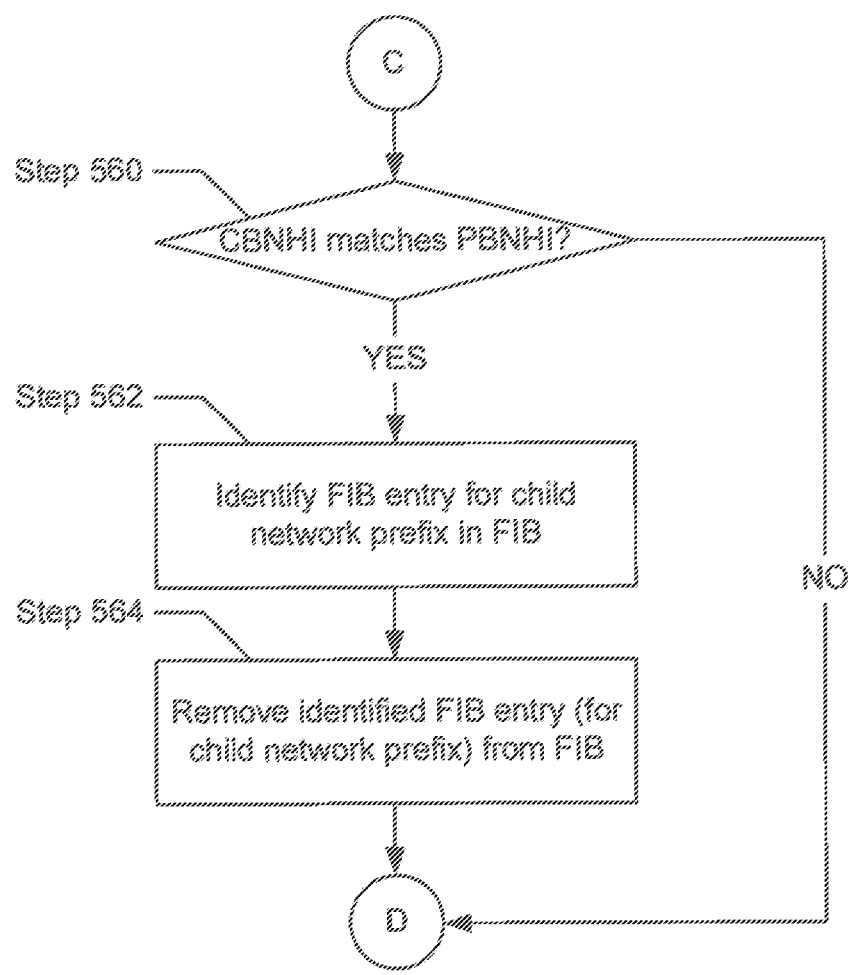

On the other hand, further to Step 542, if it is determined that the CBNHI does not match the RBNHI, the process proceeds to Step 560 (see e.g., FIG. 5D). In one embodiment of the invention, the CBNHI not matching the RBNHI may be indicative that different next hops are used to direct network packets towards destinations subsumed by the child network prefix versus the route network prefix. Therefore, the child network prefix had required its own FIB entry in the FIB, separate from the existing FIB entry (present prior to its subsequent deletion in Step 526) associated with the route network prefix. Further, as mentioned above, with the deletion of the FIB entry in the FIB associated with the route network prefix, the capability to direct network packets addressed towards destinations subsumed by the child network prefix would no longer exist, thereby mandating the creation of a new FIB entry in the FIB associated with the child network prefix. However, in this case, because the child network prefix is already associated with an existing FIB entry in the FIB, which retains the aforementioned capability despite the deletion of the existing FIB entry associated with the route network prefix, the removal of the route network prefix (from the NPT) may not require affecting the FIB.

In Step 544, a new FIB entry for which the child network prefix is associated is created in the FIB. In one embodiment of the invention, the creation of the new FIB entry may be performed as a result of determining (in Step 542) that the CBNHI matches the RBNHI. As noted above, this determination requires updating the FIB to resume the capability to direct network packets addressed towards destinations subsumed by the child network prefix, which temporarily no longer exists. To that end, in one embodiment of the invention, the new FIB entry is created to include the child network prefix and the FEC index (obtained in Step 524) referencing the existing FEC Table entry that includes the BNHI (e.g., RBNHI, which matches the CBNHI) necessary to resume the aforementioned capability.

In Step 546, (i) after creating/populating a new FIB entry for each child network prefix (of the route network prefix) (in Step 544); or (ii) after determining (in Step 520) that the RBNHI does match the PBNHI: the route network prefix is deleted/removed from the NPT. As mentioned above, in one embodiment of the invention, the removal/deletion of the route network prefix from the NPT may further entail updating the trie nodal information stored (or associated) with the parent network prefix (e.g., the existing network prefix in the NPT that had subsumed the route network prefix) and each of the set of child network prefixes (e.g., the existing network prefix(es) in the NPT that had been subsumed by the route network prefix), if any. More specifically, in one embodiment of the invention, with respect to updating the parent trie nodal information, the set of child references of the parent trie nodal information may be updated to include the identifier(s)/pointer(s) associated with the child network prefix(es) (in place of the identifier/pointer associated with the route network prefix, which used to be the child of the parent network prefix). With respect to updating each child trie nodal information (of the set of child network prefix(es)), the parent reference of each child trie nodal information may be updated to include the identifier/pointer associated with the parent network prefix (in place of identifier/pointer associated with the route network prefix, which used to be the parent of each of the child network prefixes). From here, the process subsequently ends.

Turning to FIG. 5D, in Step 560, after determining (in Step 542) that the CBNHI does not match the RBNHI (e.g., a FIB entry for the child network prefix was warranted), a fourth determination is made as to whether the CBNHI (obtained in Step 540), instead, matches the PBNHI (obtained in Step 508). If it is determined that the CBNHI matches the PBNHI, the process proceeds to Step 562. In one embodiment of the invention, the CBNHI matching the PBNHI may be indicative that both the child network prefix and the parent network prefix are reachable through the same next hop (adjacent to the network element) along one or more path(s) that includes at least the next hop. Further, since the FIB, in one embodiment of the invention, is limited or compressed to include FIB entries corresponding to routes associated with a set of the least specific network prefixes in the RIB, the FIB entry associated with the parent network prefix (which is the least specific network prefix between the child network prefix and the parent network prefix) is retained over the existing FIB entry associated with the child network prefix.

On the other hand, further to Step 560, if it is determined that the CBNHI does not match the PBNHI, the process ends. In one embodiment of the invention, the CBNHI not matching the PBNHI may be indicative that the child network prefix is reachable through a first next hop (adjacent to the network element) that is different than a second next hop (also adjacent to the network element) through which the parent network prefix is reachable. That is, in one embodiment of the invention, the two different BNHI (e.g., the CBNHI and the PBNHI) implies two different FEC Table entries currently exist in the FEC Table, each including either the CBNHI or the PBNHI. Further, the first existing FEC Table entry including the CBNHI is referenced by a first existing FIB entry associated with the child network prefix, whereas the second existing FEC Table entry including the PBNHI is referenced by a second existing FIB entry associated with the parent network prefix. Furthermore, because the child network prefix is already associated with an existing FIB entry in the FIB, no further steps are required to ensure that network packets addressed towards the child network prefix can be directed to the child network prefix when necessary.

In Step 562, after determining (in Step 560) that the CBNHI does match the PBNHI, the existing FIB entry in the FIB associated with the child network prefix is identified. In one embodiment of the invention, identification of the existing FIB entry associated with the child network prefix may entail comparing the child network prefix with each network prefix specified in each existing FIB entry in the FIB. Subsequently, the existing FIB entry in the FIB that specifies a network prefix matching the child network prefix may be selected as the existing FIB entry in the FIB associated with the child network prefix. Following this, in Step 564, the existing FIB entry associated with the child network prefix (identified in Step 562) is removed/deleted from the FIB on the network element. Subsequently, the process ends.

Figure 6A:
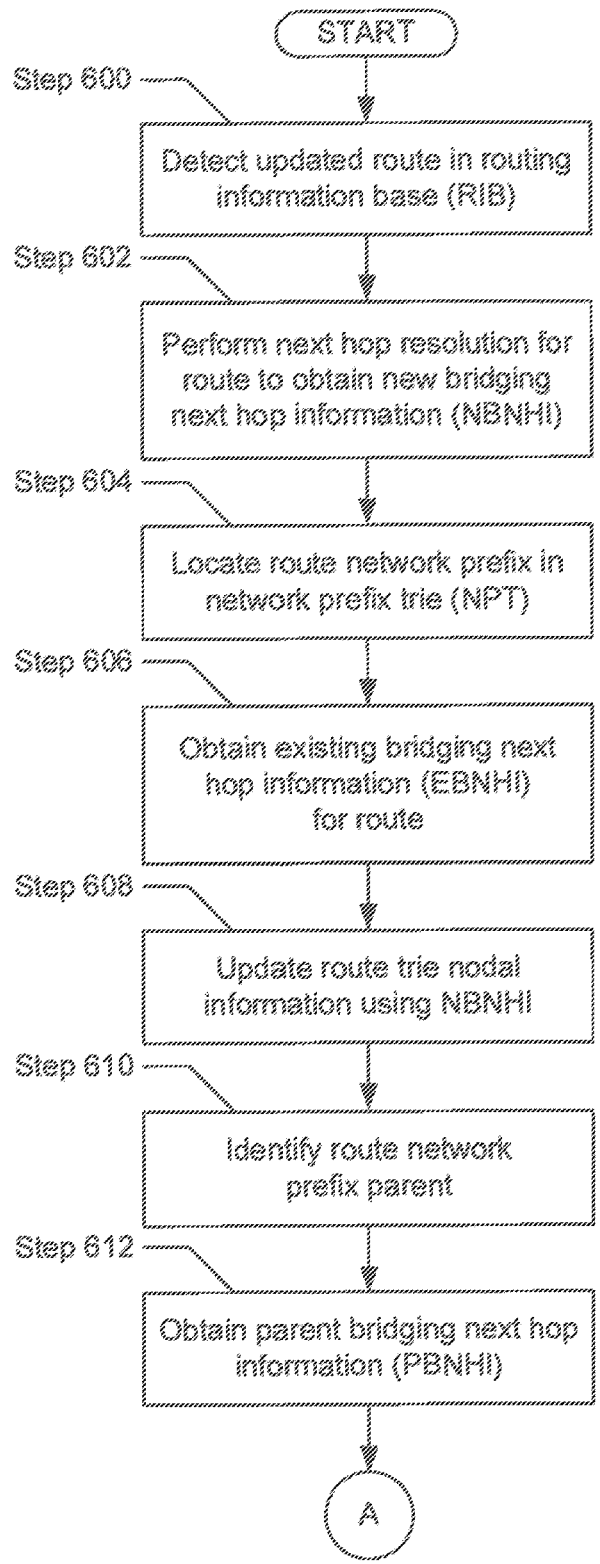
FIGS. 6A-6F show flowcharts describing a method for updating a network prefix in a network prefix trie in accordance with one or more embodiments of the invention.

FIGS. 6A-6F show flowcharts describing a method for updating a network prefix in a network prefix trie in accordance with one or more embodiments of the invention. Turning to FIG. 6A, in Step 600, a route subjected to an update in the routing information base (RIB) on the network element is detected. In one embodiment of the invention, the detection may take the form of a pushing mechanism (e.g., generation and transmission of a notification by the RIB to the forwarding information base (FIB) Compressor in response to the update of an existing route in the RIB). In another embodiment of the invention, the detection may take the form of a pulling mechanism (e.g., polling of the RIB by the FIB Compressor to identify a specific event—any update to any existing route in the RIB).

In Step 602, a next hop resolution is performed for the updated route detected in Step 600. In one embodiment of the invention, the performing of a next hop resolution results in the obtaining of new bridging next hop information (NBNHI) (see e.g., FIG. 3C) for the existing route in the RIB. More specifically, the obtaining of the NBNHI may result from resolving the new/updated route next hop information (RNHI) (see e.g., FIG. 3A) included in the RIB entry corresponding to the detected route in the RIB. In one embodiment of the invention, NBNHI may include bridging or forwarding information pertaining to a next hop (e.g., another network element or device) along a new path to a destination subsumed by the updated route. The bridging or forwarding information encompassed in the NBNHI may include, but is not limited to, a media access control (MAC) address associated with the next hop and an identifier associated with a network interface or port on the network element (on which the forwarding equivalence class (FEC) Table resides) that connects to the next hop. The identifier associated with the network interface or port may be a string of characters (e.g., letters, numbers, symbols, etc.) of any predefined length that is used to uniquely identify the network interface or port.

In Step 604, the route network prefix for the route detected in Step 600 (obtained from the updated RIB entry associated with the route (see e.g., FIG. 3A)) is used to locate the route network prefix in the network prefix trie (NPT). In one embodiment of the invention, locating or searching for the route network prefix in the NPT may involve traversing the NPT using one or more of any existing tree/trie data structure searching algorithm(s).

In Step 606, after locating the route network prefix in the NPT, the existing bridging next hop information (EBNHI) for the route network prefix is obtained. In one embodiment of the invention, obtaining of the EBNHI may entail accessing the trie nodal information stored (or associated) with the route network prefix located in Step 604 and obtaining the corresponding BNHI (e.g., value) specified in the route trie nodal information.

In Step 608, the parent of the route network prefix is identified. In one embodiment of the invention, identification of the parent may involve accessing the trie nodal information associated with the route network prefix and obtaining the parent reference specified in the route trie nodal information.

In Step 610, the parent bridging next hop information (PBNHI) associated with the parent node (or network prefix) is obtained. In one embodiment of the invention, obtaining of the PBNHI may involve accessing the trie nodal information associated with the parent node (or network prefix) identified in Step 608 (using the parent reference specified in the route trie nodal information) and obtaining the corresponding BNHI (e.g., value) specified in the parent trie nodal information.

Figure 6B:
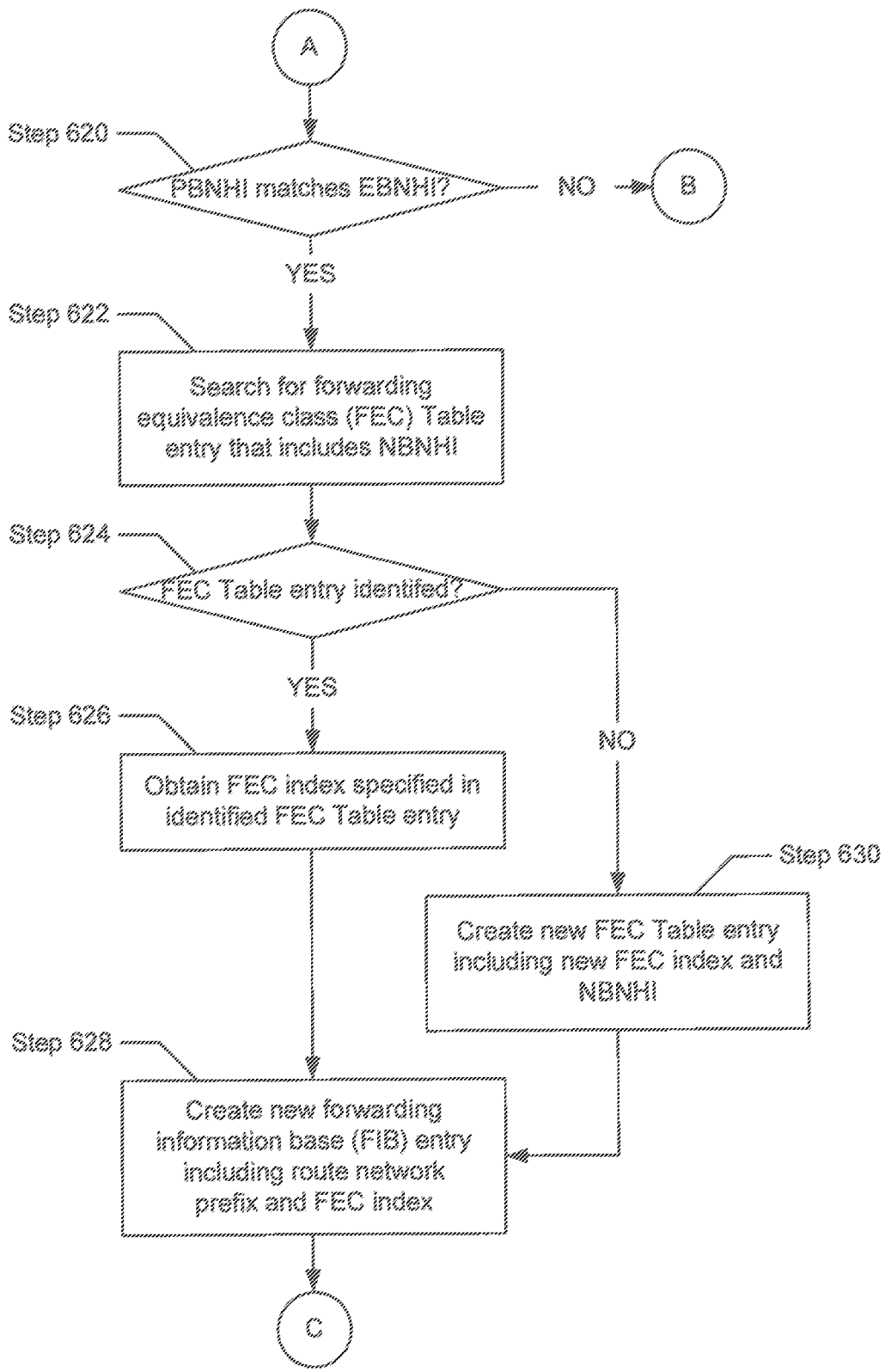

Turning to FIG. 6B, in Step 620, a first determination is made as to whether the PBNHI (obtained in Step 610) matches the EBNHI (obtained in Step 606). If it is determined that the PBNHI does match the EBNHI, the process proceeds to Step 622. In one embodiment of the invention, the PBNHI matching the EBNHI may be indicative that both the parent network prefix and the route network prefix (prior to the update detected in Step 600) were reachable through the same next hop (adjacent to the network element) along one or more path(s) that includes at least the next hop. Further, as prior to the update, the parent network prefix was the least specific network prefix between the parent network prefix and the route network prefix, no FIB entry associated with the route network prefix was warranted. However, because the PBNHI matches the EBNHI, the PBNHI conversely (and currently) does not match the NBNHI (e.g., the updated BNHI for the route network prefix). Subsequently, in view of this, creation of a FIB entry associated with the route network prefix (corresponding to the NBNHI) is needed to ensure that network packets addressed towards the route network prefix can be directed to the route network prefix when necessary.

Figure 6C:
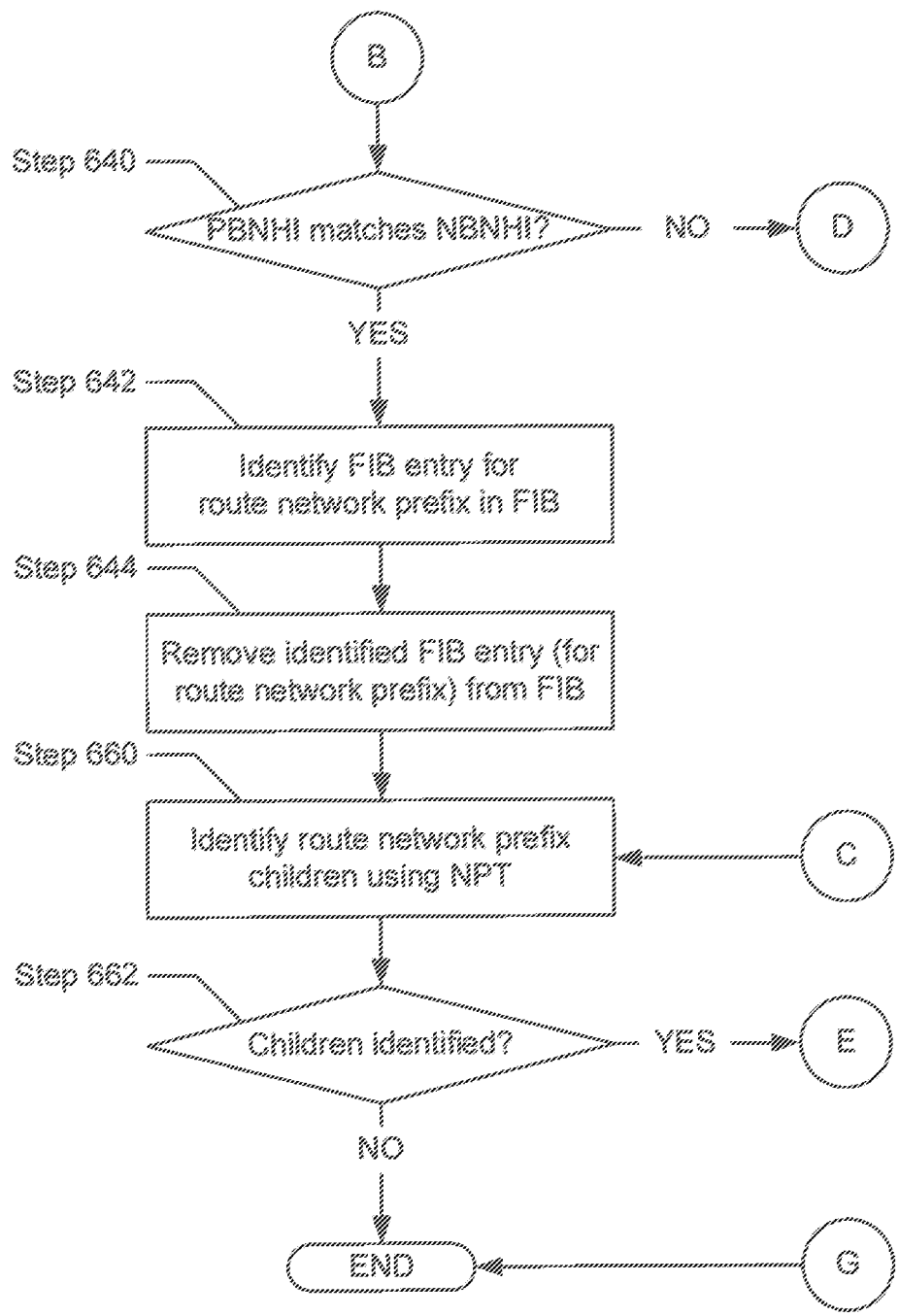

On the other hand, further to Step 620, if it is determined that the PBNHI does not match the EBNHI, the process proceeds to Step 640 (see e.g., FIG. 6C). In one embodiment of the invention, the PBNHI not matching the EBNHI may be indicative that, prior to the update to the route detected in Step 600, the parent network prefix is reachable through a first next hop (adjacent to the network element) that is different than a second next hop (also adjacent to the network element) through which the route network prefix was reachable. That is, in one embodiment of the invention, the two different BNHI (e.g., the PBNHI and the EBNHI) implies two different FEC Table entries currently exist in the FEC Table, each including either the PBNHI or the EBNHI. Further, the first existing FEC Table entry including the PBNHI is referenced by a first existing FIB entry associated with the parent network prefix, whereas the second existing FEC Table entry including the EBNHI is referenced by a second existing FIB entry associated with the route network prefix.

Proceeding with FIG. 6B, in Step 622, after determining (in Step 620) that the PBNHI does match the EBNHI, a search for an existing FEC Table entry in the FEC Table that includes the NBNHI is attempted. In one embodiment of the invention, searching for an existing FEC Table entry that includes the NBNHI may entail comparing the NBNHI to each existing BNHI specified in each existing FEC Table entry in the FEC Table. Subsequently, if an existing FEC Table entry in the FEC Table specifies BNHI that matches the NBNHI, then that FEC Table entry may be identified as the existing FEC Table entry in the FEC Table that includes the NBNHI, and may be further associated with the route network prefix.

In Step 624, a second determination is made as to whether an existing FEC Table entry (that includes the NBNHI) was identified in Step 622. If it is determined that an existing FEC Table entry was indeed identified, then the process proceeds to Step 626. On the other hand, if it is determined that no existing FEC Table entry was identified, the process proceeds to Step 630.

In Step 626, after determining (in Step 624) that an existing FEC Table entry has been identified that includes the NBNHI, the FEC index specified in the existing FEC Table entry (identified in Step 622) is obtained. Alternatively, in Step 630, after determining (in Step 624) that an existing FEC Table entry had not been identified that includes the NBNHI, a new FEC Table entry (for the route network prefix) is created. In one embodiment of the invention, the new FEC Table entry may include a new FEC index and the NBNHI (obtained in Step 602). As discussed above, the new FEC index may be an identifier referencing the new FEC Table entry (for the route network prefix) in the FEC Table. As such, the identifier may be a string of characters (e.g., letters, numbers, symbols, or any combination thereof) of any predefined length that is used to uniquely identify the new FEC Table entry (for the route network prefix). Alternatively, the FEC index may be an address in memory associated with or wherein the new FEC Table entry (for the route network prefix) is stored.

In Step 628, following the obtaining of a FEC index specified in an existing FEC Table entry (see e.g., Step 626) or the creation of a new FEC Table entry including a new FEC index (see e.g., Step 630), a new FIB entry for the route network prefix is created in the FIB on the network element. In one embodiment of the invention, the new FIB entry (for the route network prefix) may include the route network prefix and (i) the obtained FEC index (of Step 626) that references the aforementioned existing FEC Table entry; or (ii) the new FEC index that references the created/populated FEC Table entry (for the route network prefix) in Step 630. From here, the process proceeds to Step 646 (see e.g., FIG. 6C).

Turning to FIG. 6C, in Step 640, after determining (in Step 620) that the PBNHI does not match the EBNHI, a third determination is made as to whether the PBNHI, instead, matches the NBNHI. If it is determined that the PBNHI matches the NBNHI, the process proceeds to Step 642. In one embodiment of the invention, the PBNHI matching the NBNHI, while not matching the EBNHI (see e.g., Step 620), may be indicative that, as mentioned above, prior to the update of the route corresponding to the route network prefix, the difference in BNHI amongst the parent network prefix and the route network prefix would have warranted creation of a FIB entry in the FIB for the route network prefix (referencing a FEC Table entry that includes the EBNHI) to ensure that network packets addressed towards the route network prefix could be directed to the route network prefix when necessary. That is, there is an existing FIB entry in the FIB associated with the route network prefix. However, because the PBNHI now matches the NBNHI, and because the FIB is limited or compressed to include FIB entries corresponding to routes associated with a set of the least specific network prefixes in the RIB, the FIB entry associated with the parent network prefix (which is the least specific network prefix between the parent network prefix and the route network prefix) is retained over the existing FIB entry associated with the route network prefix.

Figure 6D:
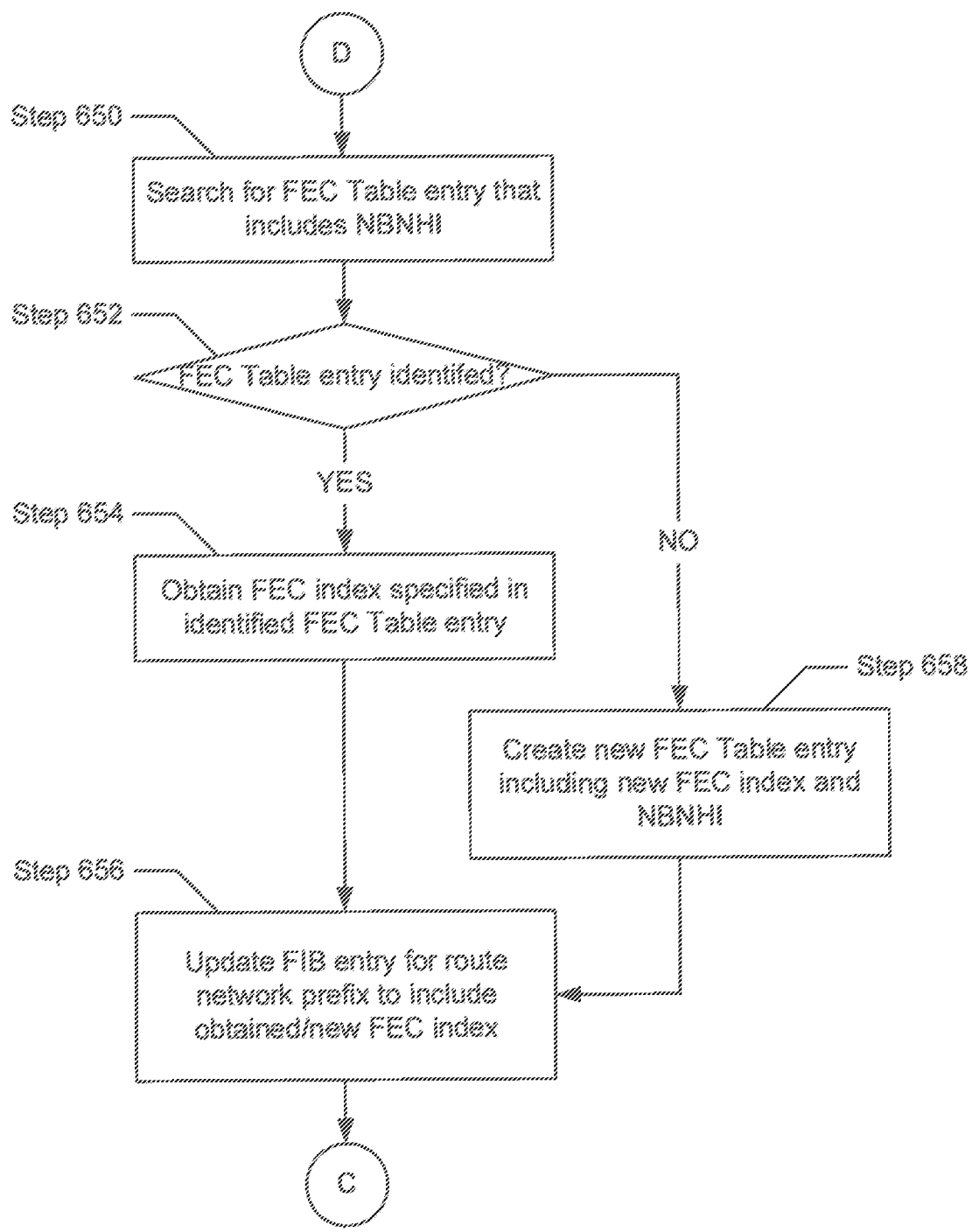
Figure 6E:
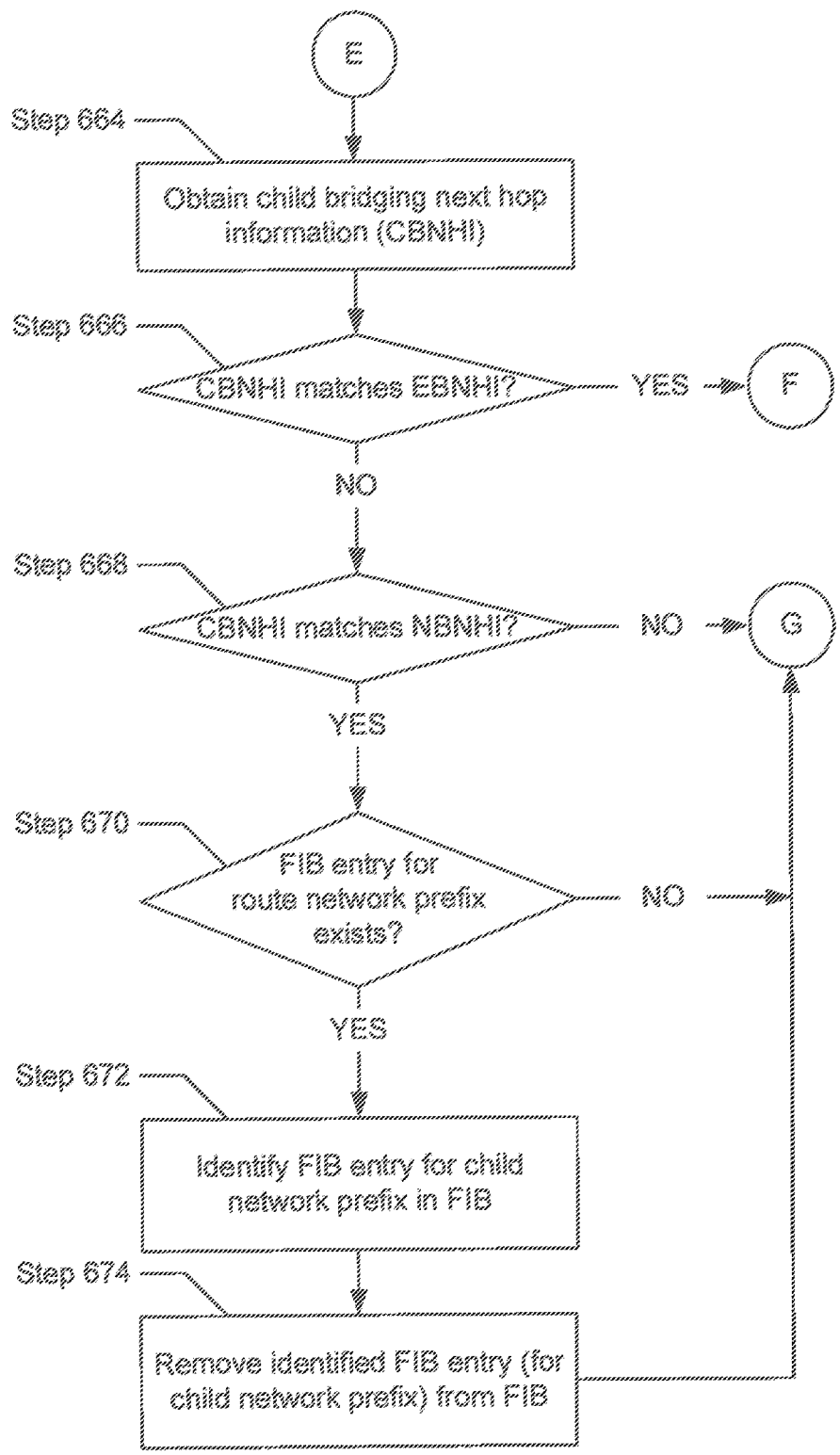
Figure 6F:
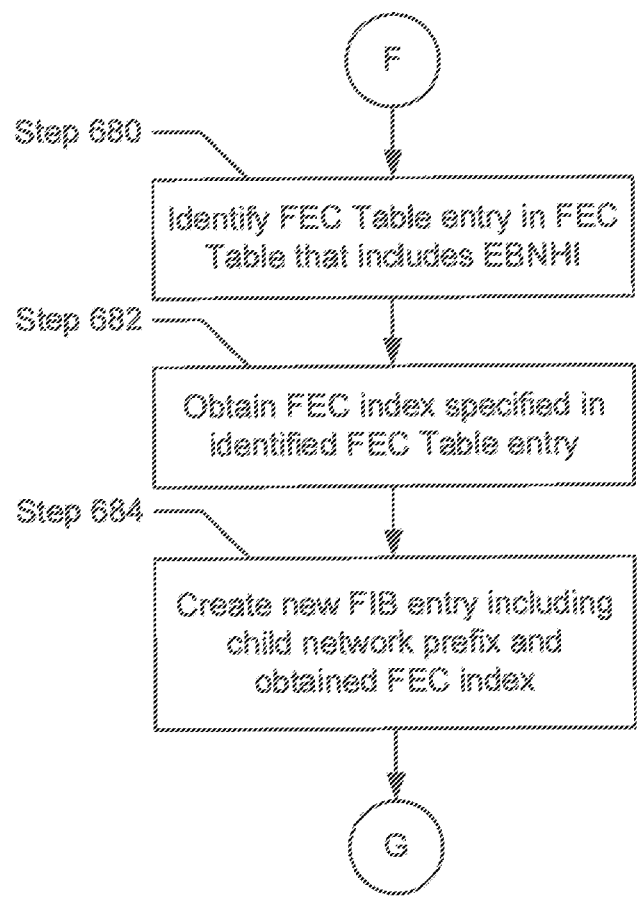

On the other hand, further to Step 640, if it is determined that the PBNHI does not match the NBNHI, the process proceeds to Step 686 (see e.g., FIG. 6F). In one embodiment of the invention, the PBNHI not matching the NBNHI, while also not matching the EBNHI (see e.g., Step 620), may be indicative that, as mentioned above, prior to the update of the route corresponding to the route network prefix, the difference in BNHI amongst the parent network prefix and the route network prefix would have warranted creation of a FIB entry in the FIB for the route network prefix (referencing a FEC Table entry that includes the EBNHI) to ensure that network packets addressed towards the route network prefix could be directed to the route network prefix when necessary. That is, as it stands, there is an existing FIB entry in the FIB associated with the route network prefix. However, because the PBNHI also does not match the NBNHI, the existing FIB entry in the FIB associated with the route network prefix must be updated to include a FEC index that references an existing (or new) FEC Table entry in the FEC Table that includes the NBNHI (in place of the existing FEC index that references an existing FEC Table entry in the FEC Table that includes the EBNHI).

Proceeding with FIG. 6C, in Step 642, after determining (in Step 640) that the PBNHI does match the NBNHI, the existing FIB entry in the FIB associated with the route network prefix is identified. In one embodiment of the invention, identification of the existing FIB entry associated with the route network prefix may entail comparing the route network prefix with each network prefix specified in each existing FIB entry in the FIB. Subsequently, the existing FIB entry in the FIB that specifies a network prefix matching the route network prefix may be selected as the existing FIB entry in the FIB associated with the route network prefix. Subsequently, in Step 644, the existing FIB entry in the FIB associated with the route network prefix (identified in Step 642) is deleted/removed from the FIB.

In Step 646, any children of the route network prefix are identified, if any. In one embodiment of the invention, proceeding onwards to Step 646 may have followed: (i) the creation of a new FIB entry associated with the route network prefix in a first case (see e.g., Step 628); (ii) the deletion/removal of an existing FIB entry associated with the route network prefix in a second case (see e.g., Step 644); or (iii) the updating of an existing FIB entry associated with the route network prefix in a third case (see e.g., Step 692). Nevertheless, in one embodiment of the invention, identification of the children may involve accessing the trie nodal information associated with the route network prefix and obtaining the set of child references, if any, specified in the route trie nodal information.

In Step 648, a fourth determination is made as to whether any children were identified in Step 646. If it is determined that zero children were identified (e.g., the set of child references specified in the route trie nodal information referenced NULL memory space), then the process ends. On the other hand, if it is determined that at least one child (of the route network prefix) has been identified, then the process proceeds to Step 660 (see e.g., FIG. 6D).

Turning to FIG. 6D, in Step 660, after determining (in Step 648) that at least one child (of the route network prefix) had been identified, child bridging next hop information (CBNHI) for the/each child of the route network prefix is obtained. In one embodiment of the invention, obtaining of the CBNHI may involve accessing the trie nodal information associated with a/the child node (or network prefix) identified in Step 646 (see e.g., FIG. 6C) (using a/the child reference specified in the route trie nodal information) and obtaining the corresponding BNHI (e.g., value) specified in a/the child trie nodal information.

In Step 662, a fifth determination is made as to whether the CBNHI (obtained in Step 660) matches the EBNHI (obtained in Step 606). If it is determined that the CBNHI does match the EBNHI, the process proceeds to Step 680 (see e.g., FIG. 6E). In one embodiment of the invention, the CBNHI matching the EBNHI may be indicative that, as the route network prefix is the least specific network prefix between the child network prefix and the route network prefix, no FIB entry associated with the child network prefix was warranted prior to the update to the existing route in the RIB corresponding to the route network prefix. However, in view of the earlier occurrence of one of the three above-mentioned scenarios leading up to Step 646 (e.g., the creation of a new FIB entry, the deletion of an existing FIB entry, or the updating of an existing FIB entry, each/all associated with the route network prefix), creation of a new FIB entry respective to the child network prefix is required in order to ensure that network packets addressed towards the child network prefix (associated with CBNHI that matches the EBNHI) can be directed to the child network prefix when necessary.

On the other hand, further to Step 662, if it is determined that the CBNHI does not match the EBNHI, the process proceeds to Step 664. In one embodiment of the invention, the CBNHI not matching the EBNHI may be indicative that, prior to the update to the route detected in Step 600, the child network prefix is reachable through a first next hop (adjacent to the network element) that is different than a second next hop (also adjacent to the network element) through which the route network prefix was reachable. That is, in one embodiment of the invention, the two different BNHI (e.g., the CBNHI and the EBNHI) implies two different FEC Table entries existing in the FEC Table, each including either the CBNHI or the EBNHI. Further, the first existing FEC Table entry including the CBNHI is referenced by a first existing FIB entry associated with the child network prefix, whereas the second existing FEC Table entry including the EBNHI was referenced by a second existing (but now potentially deleted) FIB entry associated with the route network prefix. Therefore, summarily, at this point, there presently exists a FIB entry (referencing the CBNHI) in the FIB associated with the child network prefix.

Proceeding with FIG. 6D, in Step 664, after determining (in Step 662) that the CBNHI does not match the EBNHI, a sixth determination is made as to whether the CBNHI, instead, matches the NBNHI. If it is determined that the CBNHI does match the NBNHI, the process proceeds to Step 666. In one embodiment of the invention, the CBNHI matching the NBNHI may be indicative that both the child network prefix and the route network prefix (now associated with the updated NBNHI) are reachable through the same next hop (adjacent to the network element) along one or more path(s) that includes at least the next hop. Further, as discussed above, because the CBNHI, additionally, does not match the EBNHI (see e.g., Step 662), there presently exists a FIB entry (referencing the CBNHI) in the FIB associated with the child network prefix. However, in light of the CBNHI now matching the NBNHI: (i) further to two of the three above-mentioned scenarios leading to Step 646 (e.g., the creation of a new FIB entry, or the updating of an existing FIB entry, associated with the route network prefix) and because the FIB is limited or compressed to include FIB entries corresponding to routes associated with a set of the least specific network prefixes in the RIB, the existing FIB entry associated with the route network prefix (which is the least specific network prefix between the child network prefix and the route network prefix) is retained over the existing FIB entry associated with the child network prefix; or (ii) further to the remainder of the three above-mentioned scenarios leading to Step 646 (e.g., the deletion of an existing FIB entry associated with the route network prefix) and because there exists a FIB entry in the FIB associated with the child network prefix, no additional steps are required to ensure that network packets addressed to the child network prefix can be directed to the child network prefix when necessary.

On the other hand, further to Step 664, if it is determined that the CBNHI does not match the NBNHI, the process ends. In one embodiment of the invention, the CBNHI not matching the NBNHI, while also not matching the EBNHI (see e.g., Step 662) may be indicative that the child network prefix is already associated with an existing FIB entry in the FIB (as a result of the CBNHI not matching the EBNHI). Further, in the CBNHI not matching the NBNHI, the child network prefix would require a FIB entry in the FIB to ensure that network packets addressed to the child network prefix can be directed to the child network prefix when necessary. However, as mentioned earlier, because the child network prefix is already associated with an existing FIB entry, no further actions are required in this case.

In Step 666, after determining (in Step 664) that the CBNHI does match the NBNHI, a seventh determination is made as to whether there exists a FIB entry in the FIB associated with the route network prefix. In one embodiment of the invention, recall that further to one possible scenario leading up to this point, the FIB entry in the FIB associated with the route network prefix may have been deleted (see e.g., Step 644). Accordingly, Step 666 serves as check to account for that scenario. In one embodiment of the invention, determining whether there exists a FIB entry associated with the route network prefix may entail comparing the route network prefix with each network prefix specified in each existing FIB entry in the FIB. Subsequently, if the comparison produces a result, then a FIB entry associated with the route network prefix does exist; otherwise, there is no existing FIB entry in the FIB associated with the route network prefix.

Further to Step 666, if it is determined that there is an existing FIB entry in the FIB associated with the route network prefix, the process proceeds to Step 668. In one embodiment of the invention, because the CBNHI does not match the EBNHI (see e.g., Step 662), there is an existing FIB entry in the FIB associated with the child network prefix. In addition, because the CBNHI does match the NBNHI, because there is an existing FIB entry in the FIB associated with the route network prefix, and because, in one embodiment of the invention, the FIB is limited or compressed to include FIB entries corresponding to routes associated with a set of the least specific network prefixes in the RIB, the existing FIB entry associated with the route network prefix (which is the least specific network prefix between the child network prefix and the route network prefix) is retained over the existing FIB entry associated with the child network prefix.

On the other hand, further to Step 666, if it is determined that the FIB does not contain a FIB entry associated with the route network prefix, the process ends. In one embodiment of the invention, from the above discussion leading to this step, the child network prefix maintains an associated FIB entry in the FIB because the CBNHI does not match the EBNHI (see e.g., Step 662). Further, with the CBNHI instead matching the NBNHI (see e.g., Step 664) and with no existing FIB entry associated with the route network prefix in the FIB, the existing FIB entry associated with the child network prefix requires retaining in order to ensure that network packets addressed to the child network prefix can be directed to the child network prefix. Conclusively, no further actions are needed and the process thus ends.

Proceeding with FIG. 6D, in Step 668, after determining (in Step 666) that there does exist a FIB entry associated with the route network prefix in the FIB, the existing FIB entry associated with the child network prefix is identified. In one embodiment of the invention, identification of the existing FIB entry associated with the child network prefix may entail comparing the child network prefix with each network prefix specified in each existing FIB entry in the FIB. Subsequently, the existing FIB entry in the FIB that specifies a network prefix matching the child network prefix may be selected as the existing FIB entry in the FIB associated with the child network prefix. Following this, in Step 670, the existing FIB entry associated with the child network prefix (identified in Step 670) is removed/deleted from the FIB on the network element. Subsequently, the process ends.

Turning to FIG. 6E, in Step 680, after determining (in Step 662) that the CBNHI does match the EBNHI, the FEC Table entry in the FEC Table that includes the EBNHI is identified. In one embodiment of the invention, identification of the existing FEC Table entry including the EBNHI may entail comparing the EBNHI with each BNHI specified in each existing FEC Table entry in the FEC Table. Subsequently, the existing FEC Table entry in the FEC Table that specifies BNHI matching the EBNHI may be selected as the existing FEC Table entry in the FEC Table that includes the EBNHI.

In Step 682, the FEC index specified in the FEC Table entry (identified in Step 680) is obtained. In Step 684, a new FIB entry for the child network prefix is created in the FIB on the network element. In one embodiment of the invention, the new FIB entry (for the child network prefix) may include the child network prefix and the FEC index obtained in Step 682. Subsequently, the process ends.

Turning to FIG. 6F, in Step 686, after determining (in Step 640) that the PBNHI does not match the NBNHI, a search for a FEC Table entry that includes the NBNHI is attempted. In one embodiment of the invention, searching for a FEC Table entry that includes the NBNHI may entail comparing the NBNHI with each BNHI specified in each existing FEC Table entry in the FEC Table. Subsequently, if the comparison produces a result, then a FEC Table entry that includes the NBNHI does exist; otherwise, there is no existing FEC Table entry in the FEC Table that includes the NBNHI.

In Step 688, an eight determination is made as to whether an existing FEC Table entry was identified as a result of the search performed in Step 686. If it is determined that an existing FEC Table entry was indeed identified, then the process proceeds to Step 690. Following this deduction, in Step 690, the FEC index specified in the existing FEC Table entry (identified in Step 686) is obtained.

On the other hand, further to Step 688, if it is determined that no existing FEC Table entry was identified during Step 686, then the process proceeds to Step 694. Following this deduction, in Step 694, a new FEC Table entry is created. In one embodiment of the invention, the new FEC Table entry may include a new FEC index (identifying the new FEC Table entry) and the NBNHI.

In Step 692, following the obtaining of a FEC index specified in an existing FEC Table entry (see e.g., Step 690) or the creation of a new FEC Table entry including a new FEC index (see e.g., Step 694), the existing FIB entry for the route network prefix is updated. In one embodiment of the invention, the existing FIB entry (for the route network prefix) may be updated to include the obtained FEC index (of Step 690) that references the aforementioned existing FEC Table entry. In another embodiment of the invention, the existing FIB entry (for the route network prefix) may be updated to include the new FEC index that references the created/populated FEC Table entry (for the route network prefix) in Step 694. In one embodiment of the invention, the objective of the update may be to replace an existing FEC index (referencing an existing FEC Table entry that includes the EBNHI) specified in the existing FIB entry (for the route network prefix) with a FEC index referencing a FEC Table entry that includes the NBNHI. From here, the process proceeds to Step 646.

FIGS. 7A-7D show various aspects of an example in accordance with one or more embodiments of the invention. The following example is for explanatory purposes only and not intended to limit the scope of the invention.

With respect to the following example, consider a first scenario wherein the RIB on a network element has just been updated with the addition of a new route. The new route may correspond to the network prefix "10.0.1.0/16". Prior to embodiments of the invention, the addition of the new route in the RIB may trigger programming of the FIB on the network element to include a new FIB entry for the new route. The FIB is programmed regardless of whether the new route is subsumed by a lesser specific route in the FIB, thereby maintaining a one-to-one correspondence between entries in the FIB and entries in the RIB.

Figure 7A:
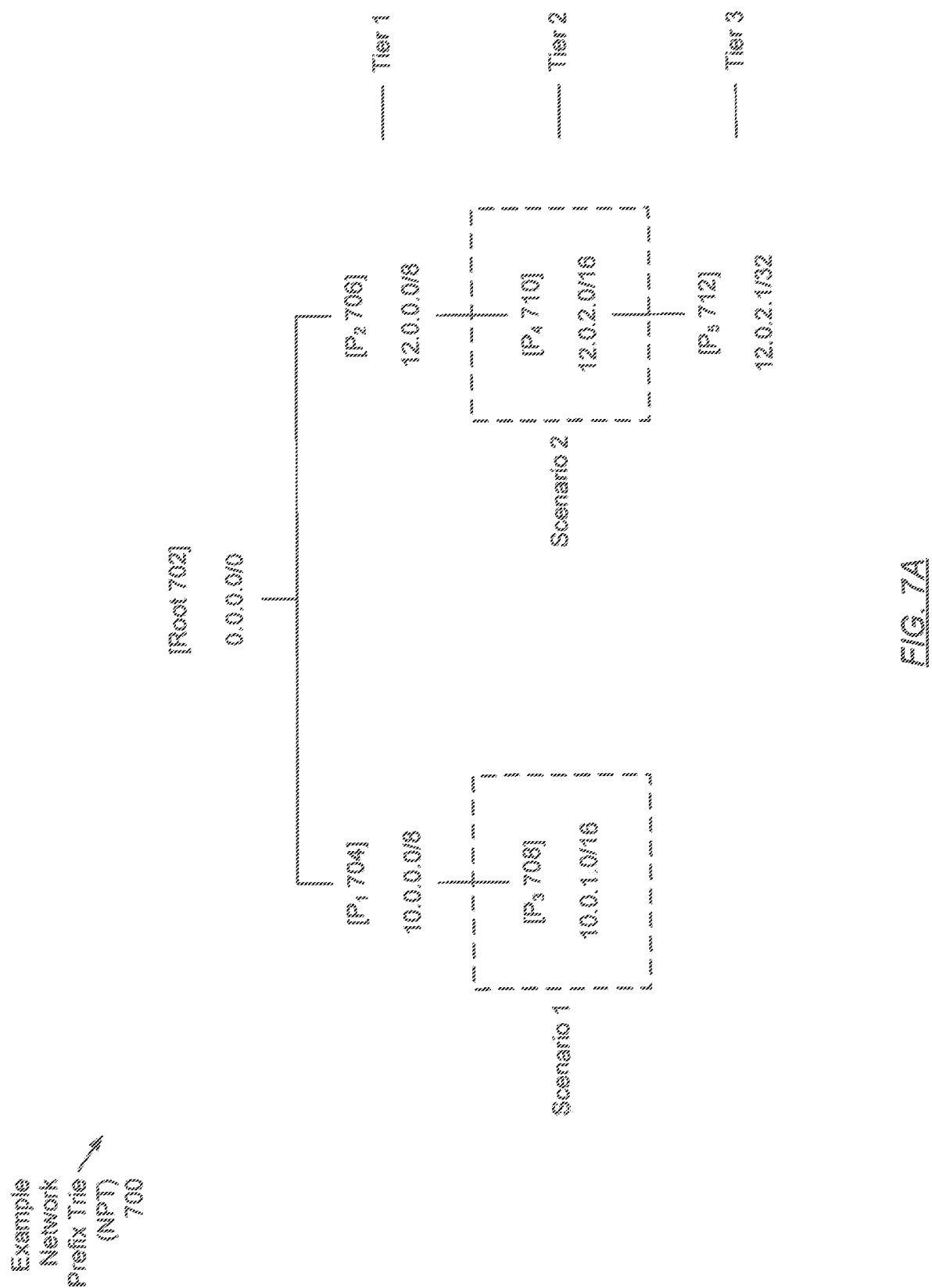

In contrast, in detecting the addition of the new route in the RIB, embodiments of the invention subsequently pursue the addition of the route network prefix (associated with the new route) to the NPT on the network element. Turning to FIG. 7A, the addition of the route network prefix may position the route network prefix $P_3$ (708) below an existing network prefix $P_1$ (704) in the NPT (700). In one embodiment of the invention, the position of the route network prefix $P_3$ (708) under the existing network prefix $P_1$ (704) may be indicative that the former prefix may include a first set of available IP addresses that are a subset of a second set of IP addresses available through latter prefix. Based on the location of the route network prefix $P_3$ (708) in the NPT (700), the existing network prefix $P_1$ (704) is identified as the parent network prefix for the route network prefix $P_3$ (708).

After obtaining route bridging next hop information (RBNHI) and parent bridging next hop information (PBNHI) for the route network prefix and the parent network prefix, respectively, a comparison of the RBNHI and the PBNHI is performed. The result, in one embodiment of the invention, may be that the RBNHI matches the PBNHI. Subsequently, the updating of the FIB to include a new FIB entry for the added route (as performed in accordance with conventional network element operation) is waived because the existing FIB entry associated with the parent network prefix $P_1$ (704) references the bridging next hop information (BNHI) (e.g., PBNHI, which matches the RBNHI) necessary to direct network packets towards both the parent network prefix $P_1$ (704) and the route network prefix $P_3$ (708). In waiving the updating of the FIB, the FIB is compressed to include at least one fewer entry relative to the RIB. FIG. 7B shows a comparison between a first FIB (720A) (in accordance with conventional network element operation) and a second FIB (720B) (in accordance with embodiments of the invention) respective to the first scenario entailing the addition of a new route to the RIB.

Further to the example, consider a second scenario wherein the RIB has just been updated with a modification to an existing route. The existing route may correspond to the network prefix "12.0.2.0/16". Further, the modification to the existing route may entail the use of a different next hop due to, for example, the failure of the original next hop. Prior to embodiments of the invention, the modification of the existing route in the RIB may trigger programming of the FIB to update the existing FIB entry associated with the route network prefix to replace an original FEC index (referencing BNHI for the original next hop) with another (existing or new) FEC index (referencing BNHI for the different next hop). Summarily, a modification to an existing route, subject to conventional network element operation, may not entail much more than the change of data (e.g., FEC indices) within the FIB.

In contrast, in detecting the update to the existing route in the RIB, embodiments of the invention may first locate an existing network prefix associated with the existing route in the NPT. Returning to FIG. 7A, the NPT (700) may show the route network prefix $P_4$ (710) to be positioned between additional existing network prefixes $P_2$ (706) and $P_5$ (712). Based on the located position of the route network prefix $P_4$ (710) in the NPT (700), the existing network prefix $P_2$ (706) is identified as the parent network prefix, whereas the existing network prefix $P_5$ (712) is identified as the child network prefix, for the route network prefix $P_4$ (710).

After obtaining the existing bridging next hop information (EBNHI) and the new bridging next hop information (NBNHI) for the route network prefix $P_4$ (710) prior to and after the update, respectively, as well as the PBNHI for the parent network prefix $P_2$ (706), a first comparison ensues between the PBNHI and the EBNHI. The result of the first comparison, in one embodiment of the invention, may be that the PBNHI does not match the EBNHI, indicating that, prior to the update, the parent network prefix $P_2$ (706) and the route network prefix $P_4$ (710) did not share a common next hop. This initial mismatching would have required the route network prefix $P_4$ (710) to be associated with a FIB entry of its own, separate from the existing FIB entry associated with the parent network prefix $P_2$ (706), prior to the update. Subsequent to the first comparison, a second comparison is thus performed between the PBNHI and the NBNHI. The result of the second comparison, in one embodiment of the invention, may deduce that the PBNHI matches the NBNHI, indicating that, after the update (or currently), the parent network prefix $P_2$ (706) and the route network prefix $P_4$ (710) now share a common next hop. In view of this matching, the existing FIB entry associated with the route network prefix $P_4$ (710) is removed, further compressing the FIB, because the existing FIB entry associated with the parent network prefix $P_2$ (706) retains the BNHI (e.g., PBNHI, which matches the NBNHI) necessary to direct network packets towards both the parent network prefix $P_2$ (706) and the route network prefix $P_4$ (710). FIG. 7C shows a comparison between the first FIB (720A) (in accordance with conventional network element operation) and the second FIB (720B) (in accordance with embodiments of the invention) respective to the first scenario and a portion of the second scenario entailing the update of a new route in the RIB.

Continuing with the second scenario, a child bridging next hop information (CBNHI) associated for the child network prefix $P_5$ (712) may be obtained. Subsequently, a third comparison is performed between the CBNHI and the EBNHI, which, in one embodiment of the invention, may result in a determination that the CBNHI does not match the EBNHI. This mismatching may be indicative that, prior to the update, the child network prefix $P_5$ (712) and the route network prefix $P_4$ (710) did not share a common next hop. Consequently, the child network prefix $P_5$ (712) would have required its own FIB entry, separate from the existing FIB entry associated with the route network prefix $P_4$ (710), prior to the update. Further, based on this first determination, a fourth comparison may be performed between the CBNHI and the NBNHI. The result of the fourth comparison, in one embodiment of the invention, may be that the CBNHI matches the NBNHI, thus indicating that, after the update (or currently), the child network prefix $P_5$ (712) shares a common next hop with the route network prefix $P_4$ (710). In view of this matching, because the existing FIB entry associated with the child network prefix $P_5$ (712) is removed, even further compressing the FIB, because the existing FIB entry associated with the parent network prefix $P_2$ (706) retains the BNHI (e.g., PBNHI, which matches the NBNHI, which matches the CBNHI) necessary to direct network packets towards the parent network prefix $P_2$ (706), the route network prefix $P_4$ (710), and further, the child network prefix $P_5$ (712). FIG. 7D shows a comparison between the first FIB (720A) (in accordance with conventional network element operation) and the second FIB (720B) (in accordance with embodiments of the invention) respective to the remainder of the second scenario entailing the update of a new route in the RIB.

Figure 8A:
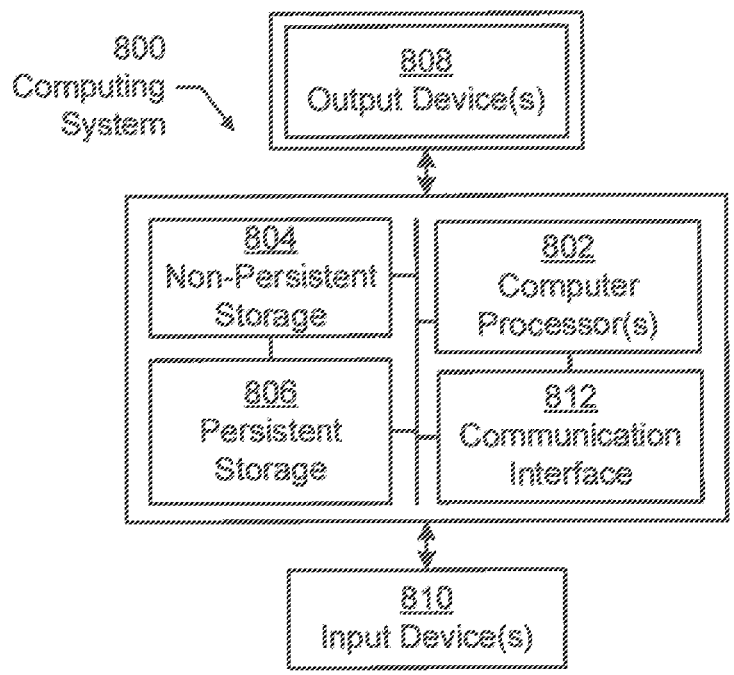
FIGS. 8A and 8B show computing systems in accordance with one or more embodiments of the invention.

Embodiments of the invention may be implemented on a computing system. Any combination of mobile, desktop, server, router, switch, embedded device, or other types of hardware may be used. For example, as shown in FIG. 8A, the computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), and numerous other elements and functionalities.

The computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device.

The communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 8B:
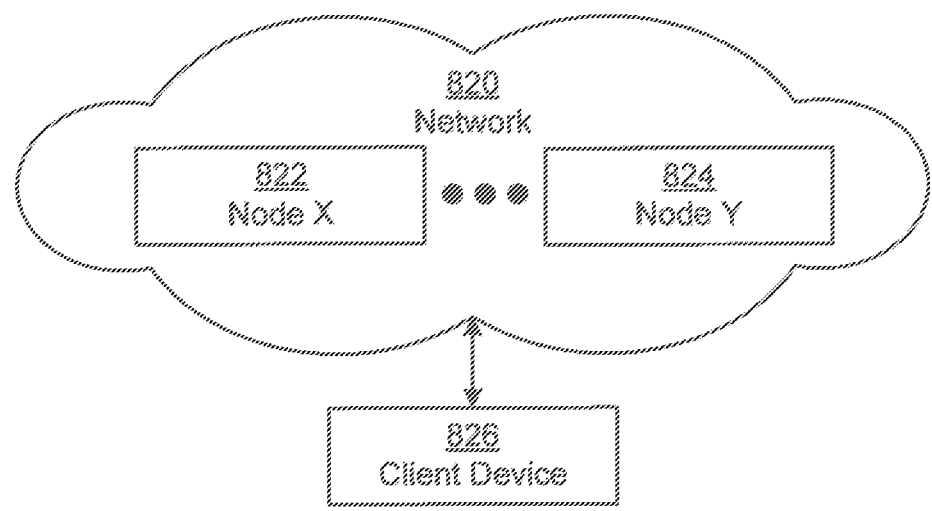

The computing system (800) in FIG. 8A may be connected to or be a part of a network. For example, as shown in FIG. 8B, the network (820) may include multiple nodes (e.g., node X (822), node Y (824)). Each node may correspond to a computing system, such as the computing system shown in FIG. 8A, or a group of nodes combined may correspond to the computing system shown in FIG. 8A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (800) may be located at a remote location and connected to the other elements over a network.

Although not shown in FIG. 8B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system shown in FIG. 8A. Further, the client device (826) may include and/or perform all or a portion of one or more embodiments of the invention.

The computing system or group of computing systems described in FIGS. 8A and 8B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

The above description of functions presents only a few examples of functions performed by the computing system of FIG. 8A and the nodes and/or client device in FIG. 8B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for programming a network element, comprising:
    detecting an update to a first route in a routing information base (RIB) and locating a first route network prefix associated with the first route;
    determining that, prior to the update, a first parent network prefix and the first route network prefix were reachable using a pair of different next hops connected to the network element;
    determining that, after the update, the first parent network prefix and the first route network prefix are reachable using a first common next hop connected to the network element; and
    in response to the determination that the first parent network prefix and the first route network prefix are reachable using the first common next hop after the update, removing an existing forwarding information base (FIB) entry in the FIB associated with the first route network prefix.

2. The method of claim 1, wherein determining that the first parent network prefix and the first route network prefix were reachable using the pair of different next hops connected to the network element comprises:
    obtaining existing bridging next hop information (EBNHI) corresponding to the first route network prefix prior to the update;
    obtaining parent bridging next hop information (PBNHI) corresponding to the first parent network prefix; and
    determining that the EBNHI does not match the PBNHI,
    wherein the EBNHI is associated with one of the next hops of the pair of different next hops, and wherein the PBNHI is associated with the other next hop of the first pair of different next hops.

3. The method of claim 1, wherein determining that the first parent network prefix and the first route network prefix are reachable using the first common next hop connected to the network element comprises:
    obtaining new bridging next hop information (NBNHI) corresponding to the first route network prefix after the update; and
    determining that the NBNHI matches the PBNHI,
    wherein the NBNHI is associated with the first common next hop, and wherein the first common next hop is one of the first pair of different next hops.

4. The method of claim 1, further comprising:
    identifying, based on the locating, a child network prefix for the first route network prefix using a network prefix trie (NPT);

determining that, prior to the update, the child network prefix and the first route network prefix were reachable using a second pair of different next hops connected to the network element;

determining that, after the update, the child network prefix and the first route network prefix are reachable using a second common next hop connected to the network element; and removing a second existing FIB entry in the FIB associated with the child network prefix.

5. The method of claim 4, wherein identifying the child network prefix comprises:

accessing trie nodal information associated with the first route network prefix;

obtaining a child reference from the trie nodal information; and identifying the child network prefix using the child reference.

6. The method of claim 1, further comprising:

detecting that a second route is removed from the RIB on the network element;

identifying a second route network prefix associated with the second route;

obtaining route bridging next hop information (RBNHI) corresponding to the second route network prefix;

identifying a second parent network prefix for the second route network prefix;

obtaining a second PBNHI corresponding to the second parent network prefix;

determining that the RBNHI does not match the second PBNHI;

removing a third existing FIB entry in the FIB associated with the second route network prefix.

7. The method of claim 6, further comprising:

identifying, based on the locating, a second child network prefix for the first route network prefix using the NPT;

obtaining child bridging next hop information (CBNHI) associated with the second child network prefix;

based on a determination that the CBNHI matches the second PBNHI and the CBNHI does not match the RBNHI, removing a fourth existing FIB entry in the FIB associated with the second child network prefix.

8. The method of claim 1, wherein determining the first parent network prefix comprises:

accessing trie nodal information associated with the first route network prefix;

obtaining a parent reference from the trie nodal information; and identifying the first parent network prefix using the parent reference.

9. The method of claim 8, wherein the trie nodal information comprises bridging next hop information (BNHI) corresponding to the first route network prefix and the parent reference.

10. The method of claim 9, wherein the trie nodal information further comprises at least one child reference.

11. A network element, comprising:

a processor;

a data plane comprising a forwarding information base (FIB); and a control plane comprising a routing information base (RIB) and a FIB Compressor operatively connected to the RIB and the FIB, and when the FIB Compressor executes on the processor, the FIB Compressor performs a method, the method comprises:

detecting an update to a first route in a routing information base (RIB) and locating a first route network prefix associated with the first route;

determining that, prior to the update, a first parent network prefix and the first route network prefix were reachable using a pair of different next hops connected to the network element;

determining that, after the update, the first parent network prefix and the first route network prefix are reachable using a first common next hop connected to the network element; and in response to the determination that the first parent network prefix and the first route network prefix are reachable using the first common next hop after the update removing an existing forwarding information base (FIB) entry in the FIB associated with the first route network prefix.

12. The network element of claim 11, wherein determining that the first parent network prefix and the first route network prefix were reachable using the pair of different next hops connected to the network element comprises:

obtaining existing bridging next hop information (EBNHI) corresponding to the first route network prefix prior to the update;

obtaining parent bridging next hop information (PBNHI) corresponding to the first parent network prefix; and determining that the EBNHI does not match the PBNHI, wherein the EBNHI is associated with one of the next hop of the pair of different next hops, and wherein the PBNHI is associated with the other next hop of the first pair of different next hops.

13. The network element of claim 11, wherein determining that the first parent network prefix and the first route network prefix are reachable using the first common next hop connected to the network element comprises:

obtaining new bridging next hop information (NBNHI) corresponding to the first route network prefix after the update; and determining that the NBNHI matches the PBNHI, wherein the NBNHI is associated with the first common next hop, and wherein the first common next hop is one of the first pair of different next hops.

14. The network element of claim 11, further comprising:

identifying, based on the locating, a child network prefix for the first route network prefix using a network prefix trie (NPT);

determining that, prior to the update, the child network prefix and the first route network prefix were reachable using a second pair of different next hops connected to the network element;

determining that, after the update, the child network prefix and the first route network prefix are reachable using a second common next hop connected to the network element; and removing a second existing FIB entry in the FIB associated with the child network prefix.

15. The network element of claim 14, wherein identifying the child network prefix comprises:

accessing trie nodal information associated with the first route network prefix;

obtaining a child reference from the trie nodal information; and identifying the child network prefix using the child reference.

16. The network element of claim 11, further comprising:

detecting that a second route is removed from the RIB on the network element;

identifying a second route network prefix associated with the second route;

obtaining route bridging next hop information (RBNHI) corresponding to the second route network prefix;

identifying a second parent network prefix for the second route network prefix;

obtaining a second PBNHI corresponding to the second parent network prefix;

determining that the RBNHI does not match the second PBNHI;

removing a third existing FIB entry in the FIB associated with the second route network prefix.

17. The network element of claim 16, further comprising:

identifying, based on the locating, a second child network prefix for the first route network prefix using the NPT;

obtaining child bridging next hop information (CBNHI) associated with the second child network prefix;

based on a determination that the CBNHI matches the second PBNHI and the CBNHI does not match the RBNHI, removing a fourth existing FIB entry in the FIB associated with the second child network prefix.

18. The network element of claim 11, wherein determining the first parent network prefix comprises:

accessing trie nodal information associated with the first route network prefix;

obtaining a parent reference from the trie nodal information; and identifying the first parent network prefix using the parent reference.

19. The network element of claim 18, wherein the trie nodal information comprises bridging next hop information (BNHI) corresponding to the first route network prefix and the parent reference.

20. The network element of claim 19, wherein the trie nodal information further comprises at least one child reference.

* * * * *